US009165552B2

(12) United States Patent
Oikawa et al.

(10) Patent No.: US 9,165,552 B2
(45) Date of Patent: Oct. 20, 2015

(54) ULTRASONIC IMAGING APPARATUS AND METHOD OF CONTROLLING DELAY

(75) Inventors: Katsuya Oikawa, Tokyo (JP); Haruo Yoda, Nishitama-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 13/520,410

(22) PCT Filed: Feb. 22, 2011

(86) PCT No.: PCT/JP2011/054422
§ 371 (c)(1),
(2), (4) Date: Jul. 3, 2012

(87) PCT Pub. No.: WO2011/105593
PCT Pub. Date: Sep. 1, 2011

(65) Prior Publication Data
US 2012/0281902 A1    Nov. 8, 2012

(30) Foreign Application Priority Data

Feb. 23, 2010  (JP) ................................ 2010-036890

(51) Int. Cl.
*G06K 9/00*  (2006.01)
*G10K 11/34*  (2006.01)
*G01S 7/52*  (2006.01)

(52) U.S. Cl.
CPC ........... *G10K 11/346* (2013.01); *G01S 7/52034* (2013.01); *G01S 7/52049* (2013.01)

(58) Field of Classification Search
CPC ............ A61B 8/14; A61B 8/483; A61B 8/00; A61B 8/4483; A61B 8/4281; A61B 8/4477; A61B 8/4494; A61B 8/52; A61B 2019/5276; G10K 11/345; G06T 2207/10132; G06T 7/602; G06T 2207/30004; G06K 2209/057
See application file for complete search history.

(56) References Cited

U.S. PATENT DOCUMENTS

| | | | | |
|---|---|---|---|---|
| 4,817,614 A | * | 4/1989 | Hassler et al. | ............... 600/441 |
| 5,522,391 A | * | 6/1996 | Beaudin et al. | ............... 600/443 |

(Continued)

FOREIGN PATENT DOCUMENTS

| | | |
|---|---|---|
| CN | 101371789 | 2/2009 |
| EP | 696791 | 2/1996 |

(Continued)

OTHER PUBLICATIONS

H.T. Feldkämper et al., "Low Power Delay Calculation for Digital Beamforming in Handheld Ultrasound Systems", *IEEE Ultrasonics Symposium*, vol. 2, pp. 1763-1766 (Oct. 22, 2000), XP010540954.

(Continued)

*Primary Examiner* — Vu Le
*Assistant Examiner* — Guillermo Rivera-Martinez
(74) *Attorney, Agent, or Firm* — Fitzpatrick, Cella, Harper & Scinto

(57) ABSTRACT

The present invention enables ultrasonic propagation time values after correction of refraction to be calculated in parallel for each receive channel, by using a recurrence relation in the depth direction. Moreover, accumulation of errors can be avoided by using an accurate propagation time value obtained in advance at a reference depth to correct the propagation time value each time the reference depth is reached. For this error correction, the recurrence relation to calculate the propagation time value can be an approximate expression. For example, the propagation time value can be calculated using the inclination of reference propagation time values between reference depths. In an actual circuit, received signals are sequentially stored in a memory, and a receive beam is formed by calculating an address position corresponding to the propagation time value of the ultrasonic wave, and adding the received signals stored in the calculated addresses.

17 Claims, 10 Drawing Sheets

(56) References Cited

U.S. PATENT DOCUMENTS

| | | | | |
|---|---|---|---|---|
| 5,724,972 | A * | 3/1998 | Petrofsky | 600/437 |
| 5,928,152 | A * | 7/1999 | Wright et al. | 600/447 |
| 6,123,671 | A * | 9/2000 | Miller | 600/447 |
| 6,423,005 | B1 * | 7/2002 | Miwa et al. | 600/443 |
| 6,443,897 | B1 * | 9/2002 | Dubberstein et al. | 600/447 |
| 6,607,489 | B2 * | 8/2003 | Hoctor et al. | 600/443 |
| 6,705,994 | B2 * | 3/2004 | Vortman et al. | 600/443 |
| 6,958,041 | B2 * | 10/2005 | Baba et al. | 600/443 |
| 2002/0002333 | A1 * | 1/2002 | Angelsen et al. | 600/443 |
| 2004/0122323 | A1 * | 6/2004 | Vortman et al. | 600/459 |
| 2006/0058685 | A1 * | 3/2006 | Fomitchov et al. | 600/476 |
| 2007/0213615 | A1 * | 9/2007 | McLaughlin et al. | 600/447 |
| 2008/0024755 | A1 * | 1/2008 | Jiang et al. | 356/4.03 |
| 2009/0054770 | A1 * | 2/2009 | Daigle | 600/437 |
| 2009/0275837 | A1 | 11/2009 | Shiina et al. | 600/459 |
| 2009/0299185 | A1 | 12/2009 | Oikawa et al. | 600/447 |
| 2010/0030081 | A1 * | 2/2010 | Masuzawa et al. | 600/459 |
| 2010/0070233 | A1 * | 3/2010 | Masumura | 702/127 |
| 2010/0324422 | A1 * | 12/2010 | Wanda et al. | 600/443 |
| 2011/0128816 | A1 * | 6/2011 | Baba et al. | 367/11 |
| 2011/0237950 | A1 * | 9/2011 | Meng | 600/447 |
| 2012/0044785 | A1 | 2/2012 | Yoda et al. | 367/92 |

FOREIGN PATENT DOCUMENTS

| | | | | |
|---|---|---|---|---|
| EP | 0881492 | | 12/1998 | |
| JP | S58(1983)-144767 | * | 8/1983 | |
| | IDS | | | |
| JP | S58-144767 | | 8/1983 | |
| JP | H08-070404 | | 3/1998 | |
| JP | 2004-166745 | | 6/2004 | |
| WO | WO 01/26555 | | 4/2001 | |
| WO | WO 0126555 A1 | * | 4/2001 | A61B 8/00 |

OTHER PUBLICATIONS

Office Action issued on Jan. 6, 2014, in counterpart Chinese (P.R.C.) patent application 201180010435.9, with translation.

Office Action issued Mar. 4, 2014 in counterpart Japanese patent application JP2010-036890, with translation.

* cited by examiner

ULTRASONIC IMAGING APPARATUS AND METHOD OF CONTROLLING DELAY

TECHNICAL FIELD

The present invention relates to an ultrasonic imaging apparatus for receiving ultrasonic waves which are reflected or generated in a subject and for imaging the received ultrasonic waves, and more particularly to a digital ultrasonic imaging apparatus which performs delay correction, according to the ultrasonic propagation time, on signals obtained from a plurality of receiving elements for forming a receive beam.

BACKGROUND ART

Since ultrasonic waves do not cause exposure and are basically non-invasive, ultrasonic image diagnosis is widely used. Particularly in recent years, the delay time generated for forming an ultrasonic beam can be easily controlled at high precision because of the advancement of digitization of ultrasonic imaging apparatuses. By this, a high quality biological tomographic image can be obtained using a compact apparatus, which is used for the diagnosis of each area. In addition to an ultrasonic echo diagnostic apparatus which irradiates ultrasonic waves onto a subject, receives the echo and generates an image thereof, a photoacoustic imaging apparatus which irradiates pulsed lights and receives photoacoustic waves (ultrasonic waves) generated inside the subject, and generates an image thereof, has also been proposed.

In conventional ultrasonic imaging apparatuses, delay time control, for forming an ultrasonic beam, is often performed based on the assumption that an ultrasonic wave propagates through a medium of which sound velocity is constant. On the other hand, if a material of which sound velocity is different from a biological tissue, that is a subject, such as a stationary plate for securing an acoustic lens layer on the surface of an ultrasonic probe and the biological tissue, exists between the biological tissue and a transducer which transmits/receives ultrasonic waves, the ultrasonic waves are refracted at the boundary of the areas having different sound velocities. As a result, in the case of a conventional delay time control, a focal point of an ultrasonic beam is not formed well, and image quality deteriorates. When a thick fat layer exists on the subject surface as well, ultrasonic waves are refracted in the same manner, since the sound velocities of the fat layer and the biological tissue under the fat layer are different, and as a result, the tissue under the fat layer is not clearly imaged.

A quantity of delay when a layer having a different sound velocity exists between a subject and a transducer can be analytically determined by considering a path of refraction using Snell's Law. Some methods of correcting the delay time using Snell's Law have been proposed.

U.S. Pat. No. 6,607,489 (PTL 1) discloses an ultrasonic apparatus having a stationary plate for securing a biological tissue, where delay time, due to the difference of the sound velocities between the stationary plate and a target tissue based on an accurate calculation, is stored in the apparatus in advance for each transducer and each focal point, and delay of the transmit/receive beam is controlled using this delay time. Calculating the delay time in real-time is also disclosed, but a concrete numerical computing algorithm is not disclosed.

WO 01-026555 (PTL 2) discloses an ultrasonic imaging apparatus which corrects the influence on refraction by an acoustic lens and a fat layer on the surface of a tissue, so as to suppress deterioration on the quality of an image of the tissue area under the fat layer of the subject. Since the influence on the refraction by a fat layer, which is relatively thick and which thickness is different depending on the target subject, the delay time in each transducer is determined by computation using a delay time correction approximate expression based on Snell's Law. In the method of WO 01-026555, the delay time in the next transducer is calculated using recurrence relation based on the delay time in the adjacent transducer. Thereby the computing time is reduced.

(PTL 1) U.S. Pat. No. 6,607,489
(PTL 2) International Publication No. WO01-026555

SUMMARY OF INVENTION

However in the case of U.S. Pat. No. 6,607,489, delay time must be stored for all the transducers on all the focal points in advance. Therefore a huge memory for storing delay time values is required in order to have a high number of focal points of dynamic focus during reception to implement high image quality. Generally the resolution improves as a number of transducer elements increases and as a number of focal points of the dynamic receiving focus increases. It is also desired to capture images deep in a subject. In any case, a number of delay time values to store increases, and the circuit scale become huge.

Furthermore if the thickness of the stationary plate that intervenes changes, new sets of delay time values are required accordingly. U.S. Pat. No. 6,607,489 also discloses an apparatus including an computing unit which performs accurate calculation on the ultrasonic wave propagation paths including refraction to determine delay time, and a set of delay time values can be computed according to the thickness of the stationary plate that intervenes, but a concrete numerical algorithm of the ultrasonic wave propagation path calculation is not disclosed. Therefore the delay time is computed using a processor dedicated to numerical operation, such as an MPU, or a CPU of a general purpose PC, for efficiently performing general numeric operation. However in the dynamic focus during reception, the delay time in each transducer must be changed at high-speed according to the propagation timing of the transmit ultrasonic pulse. Hence a huge memory for storing delay time values is required in the digital circuits, also in the case of calculating delay time values using a general purpose PC for performing control and reading these values into digital circuits for forming ultrasonic beams. Otherwise a means of transferring data from a PC to digital circuits at high-speed is required. In both configurations, the circuit scale increases and the apparatus becomes expensive. The MPU dedicated to numerical operation also causes an increase in scale and cost of the digital circuits for forming ultrasonic beams. In this way according to U.S. Pat. No. 6,607,489, the scale of conventional digital circuits is increased, which makes the size and cost of the apparatus, and the processing speed and limits on resolution that can be set become inferior to prior art. As a result, the advantages of a conventional ultrasonic diagnostic apparatus, which are real-time characteristics of image observation, and flexible diagnosis in a wide range implemented by a compact apparatus configuration, are diminished.

Advantages of the conventional art disclosed in WO 01-026555 are: an error of an approximated delay time can be decreased even if the medium having a different sound velocity becomes thicker; and processing can be executed at a relatively high-speed. However if the dynamic receiving focus for changing the focal point in real-time is performed according to this method, the following problems remain. That is, the computing processing, which is sequentially performed with a recurrence relation, uses a recurrence relation with respect to the position of the transducer, so the quantity of delay must be calculated for all the transducers on each focal point. Therefore real-time processing is executed well if the apparatus has many transducers on a small number of focal points. But in the case of performing dynamic receiving focus, calculation using the recurrence relation must be performed for each focal point, and processing amount increases, therefore this method is not appropriate for real-time processing. This problem becomes particularly conspicuous if many receive focal points are set to make resolution higher.

On the other hand, in the case of receive processing of a conventional ultrasonic imaging apparatus, high-speed image generation in real-time is implemented by parallel-processing, such as signal processing for each transducer, particularly amplifying and digitizing of received signal and delay time control, almost independently for each channel. However in the case of processing according to WO 01-026555, the recurrence relation processing for resetting the delay time for all the transducers must be executed every time the receive focal point changes, as mentioned above, so this parallel processing operation cannot be used effectively. In order to execute the entire processing in which many receive focal points are set, in real-time, a computing processing circuit to perform delay calculation separately and a large memory capacity to store the calculation result, are required after all.

Therefore to perform dynamic receiving focus using the processing according to WO 01-026555, conventional digital circuits must be dramatically changed, particularly the memory and computing circuits to be used must be increased or a number of receive focal points must be decreased, so that time for resetting delay time when the focal point is changed is decreased. As a result, it is difficult to improve resolution at reception by increasing the number of receive focal points for receive focus.

Ultrasonic imaging apparatuses based on a photoacoustic imaging method as well have problems stemming from the above mentioned problems. Particularly in the case of the photoacoustic imaging method for generating three-dimensional images, the propagation time of the receive ultrasonic wave must be estimated for each depth, just like the dynamic receiving focus of the ultrasonic pulse echo method. It is preferable that a two-dimensional array is used for the transducer array, where many transducers are disposed, in order to improve resolution. Therefore in the case of the ultrasonic image diagnostic apparatus based on the conventional photoacoustic imaging method, the processing amount for reconstructing the three-dimensional image becomes enormous, and it is difficult to generate and display an image in real-time. Processing after data is obtained is subsequently performed using a general purpose PC, so diagnosis in real-time is difficult compared with an ultrasonic image diagnostic apparatus using the conventional ultrasonic pulse echo method.

With the foregoing in view, it is an object of the present invention to provide an ultrasonic imaging apparatus to perform the delay amount calculation processing at high-speed considering the propagation path of ultrasonic waves.

The present invention in one aspect presents an ultrasonic imaging apparatus comprising: an ultrasonic receiver having a plurality of receiving elements for receiving ultrasonic waves reflected or generated inside a subject; a receive beam former which forms a receive beam signal by performing delay control on received signals of receive channels corresponding to at least a part of the receiving elements of the ultrasonic receiver, according to a propagation time from a focal point position of the receive beam to the receiving element; and an image processor which generates an image using the receive beam signal, wherein the receive beam former sequentially calculates propagation time values for a plurality of focal points by repeating processing for adding a change of propagation time value corresponding to a change of depth of focal point to an already calculated propagation time value to determine a propagation time value for a next focal point, and the repeat processing can be independently executed for each of the receive channels, and the receive beam former calculates the propagation time values in parallel for at least a part of the receive channels.

According to the present invention, propagation time values corresponding to a plurality of focal points are calculated by recurrence relation for the depth direction of each receive channel, therefore the propagation time values can be calculated in parallel for a plurality of channels, and the delay time values can be calculated at high-speed.

Further features of the present invention will become apparent from the following description of exemplary embodiments with reference to the attached drawings.

DESCRIPTION OF EMBODIMENTS

The present invention is a technique which can be effectively applied to a diagnostic apparatus, which receives ultrasonic waves reflected or generated in a subject by a plurality of receiving elements, converts the received ultrasonic waves into received signals, and performs delay control for each receiving element according to the ultrasonic wave propagation time to generates receive beam signals. An example of such a diagnostic apparatus is an ultrasonic echo diagnostic apparatus, which allows ultrasonic pulses to enter a subject from transducers (ultrasonic transmitter/receiver units), receives ultrasonic echoes reflected from an area inside the subject, and generates an image thereof. Another example is a photoacoustic imaging apparatus which irradiates pulsed light onto a subject, receives an ultrasonic wave generated inside by the photoacoustic effect, converts this into a received signal, and generates an image using this received signal. In this description, apparatuses which receive ultrasonic waves coming from inside the subject and generate images are generically called "ultrasonic imaging apparatuses".

<Ultrasonic Wave Propagation Time Calculation Processing>

(Deriving Approximate Recurrence Relation for Calculating Ultrasonic Wave Propagation Time)

Figure 7:
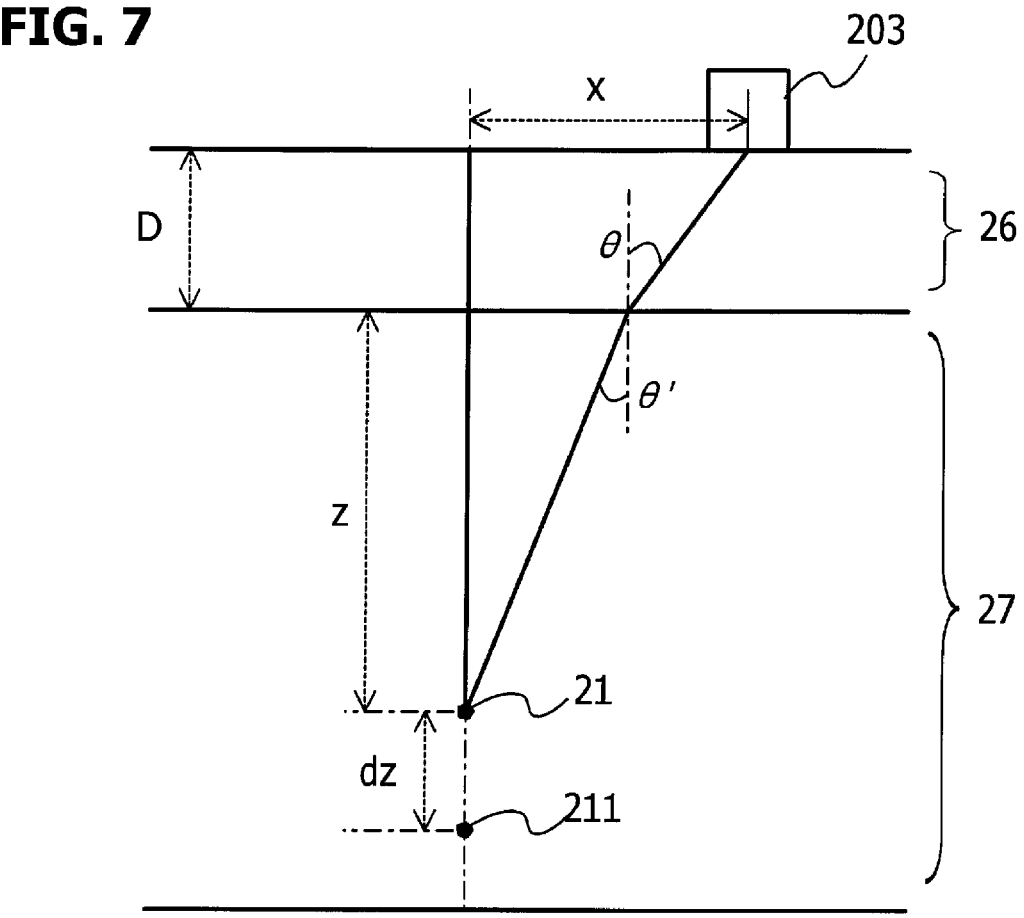
FIG. 7 is a diagram depicting ultrasonic wave propagation time.

An example of a calculation method of approximating the propagation time considering refraction of an ultrasonic wave according to the present invention will now be described. FIG. 7 shows a state of refraction of an ultrasonic wave propagating from a focal point 21 to a transducer 203. When x is a position of the transducer 203, D is a thickness of a portion of a medium 26 out of the focal length, that is a thickness of the medium 26, z is a portion of a medium 27 out of the focal length (depth of focal point), θ is a refractive angle in the medium 26, and θ' is a refractive angle in the medium 27, the following relational expressions are established. If z is a negative value, the focal point 21 is in the medium 26, and in this case, the ultrasonic wave propagation time can be calculated based on the assumption that the sound velocity is uniform, just like the case of prior art, so the case of z, which is not a negative value, will be described. Depending on whether z is a negative or a non-negative value, this method may be driven by switching with a conventional art. Z is called "depth" herein below.

[Math. 1]

$$\frac{\sin\theta}{\sin\theta'} = \frac{V_m}{V_{tis}}, \quad \text{Eq. 1(a)}$$

$$D\tan\theta + z\tan\theta' = x, \quad \text{Eq. 1(b)}$$

$$T = \frac{D}{V_m}\frac{1}{\cos\theta} + \frac{z}{V_{tis}}\frac{1}{\cos\theta'}. \quad \text{Eq. 1(c)}$$

where $V_{tis}$ is a sound velocity in medium 27, $V_m$ is a sound velocity in medium 26, and T is a propagation time for the ultrasonic wave reflected or generated at a focal point 21 to reach a transducer 203. Eq. 1(a) expresses Snell's Law of refraction, Eq. 1(b) expresses a geometric relationship of the focal point 21 and the transducer 203, and Eq. 1(c) expresses the relationship of the length of the ultrasonic wave propagation path and the sound velocity.

A focal point 211, which is in a deeper position than the focal point 21 is considered. If the thickness of the medium 26 does not change, the change of the focal point is only dz, which is a change component of z. Therefore the following approximate recurrence relation is established with respect to the ultrasonic wave propagation time Ti by considering an increment of dz when the depth of focal point sequentially changes for each dz.

[Math. 2]

$$T_{i+1} = T_i + dT_i. \quad \text{Eq. 2}$$

The change of the ultrasonic wave propagation time $dT_i$ when the depth of focal point changes dz, where $\Sigma_i$ and $\eta_i$ are cos θ' and cos θ ($\xi_i$=cos θ', $\eta_i$=cos θ) in Eq. 1 corresponding to the respective $z_i$, is expressed as follows.

[Math. 3]

$$dT_i = \xi_i \frac{dz}{V_{tis}}, \quad \text{Eq. 3(a)}$$

$$\xi_{i+1} = \xi_i + d\xi_i, \quad \text{Eq. 3(b)}$$

$$\eta_{i+1} = \eta_i + d\eta_i, \quad \text{Eq. 3(c)}$$

$$z_{i+1} = z_i + dz. \quad \text{Eq. 3(d)}$$

Here, $d\xi_i$ and $d\eta_i$ are expressed as following using $r_i$.

[Math. 4]

$$r_i = \frac{\xi_i}{\eta_i}, \quad \text{Eq. 4(a)}$$

$$d\xi_i = \frac{\xi_i(1-\xi_i^2)}{D\cdot\gamma\cdot r_i^3 + z_i}dz, \quad \text{Eq. 4(b)}$$

$$d\eta_i = \gamma^2 r_i d\xi_i. \quad \text{Eq. 4(c)}$$

γ is a quantity shown below, and is a constant in the recurrence relation calculation if the medium 26 and the medium 27 are determined. In this way, the increment $dT_i$ of the ultrasonic wave propagation time is determined by parameters $\xi_i$ and $\eta_i$, which are determined by a recurrence relation. A parameter which is for determining $dT_i$, and which is determined by a recurrence relation, is referred to as a "recurrence parameter" in this description.

[Math. 5]

$$\gamma = \frac{V_m}{V_{tis}}. \quad \text{Eq. 5}$$

By using the above mentioned relational expression (approximate recurrence relation), $\xi_{i+1}$ and $\eta_{i+1}$ can be computed at a focal point of which depth is changed by dz can be computed if $\xi_i$, $\eta_i$ and $dT_i$ at a depth $z_i$ are known. Using this, the increment $dT_i$ of the ultrasonic wave propagation time can be computed, and the ultrasonic wave propagation time $T_{i+1}$ can be approximately computed by adding this increment $dT_i$ to the calculated ultrasonic wave propagation time $T_i$.

By sequentially progressing the calculation in a direction of deeper depth of focal point (dz>0), or in a direction of shallower depth of focal point (dz<0) using this recurrence relation, a string of ultrasonic wave propagation time values $T_{i+1}$ with respect to a plurality of focal points having different depths can be approximately calculated sequentially. It does not matter which calculation direction is used, but the direction in which depth of focal point sequentially increases according to the propagation of the transmitted pulse is preferable if this method is applied to the dynamic receiving focus, for example.

The accuracy of approximation increases as the absolute value of the interval dz of focal points is smaller. In particular, the cycle of the clock frequency for sampling the received signals (signal generated (converted) by the receiving element receiving the ultrasonic wave) to generate digital signals is the limit of the time resolution of the digital received signals, so it is preferable to select dz corresponding to this cycle. In this case, the smallest interval of the focal points is a distance for the transmitted ultrasonic pulse to propagate the medium 26 during a cycle of the clock frequency, and is $|dz|=V_{tis} \times T_{clk}$, where $T_{clk}$ is a cycle of the clock frequency.

(Initial Values)

The parameter γ and the interval dz of the focal points are the same for all the transducers, and if a position x of each transducer and initial values $\xi_0$, $\eta_0$, $T_0$ and $z_0$ are given, the ultrasonic propagation time $T_{i+1}$ at each interval dz of the focal points is sequentially computed by the above recurrence relation.

For the initial values $\xi_0$, $\eta_0$ and $T_0$ values which are calculated in advance for each transducer can be used. Particularly in the case of sequentially calculating in a direction of deeper depth of focal point, the initial depth $z_0$ can be set to zero, that is, the initial focal point can be set on the boundary of the medium 26 and medium 27. At this time, the ultrasonic wave propagates from the focal point to each transducer only in the medium 26, so the initial values $T_0$, $\xi_0$ and $\eta_0$ can be calculated in the same manner as the conventional ultrasonic propagation time based on a same sound velocity for each transducer, as shown below.

[Math. 6]

$$T_0 = \frac{\sqrt{D^2 + x^2}}{V_m}, \qquad \text{Eq. 6(a)}$$

$$\eta_0 = \frac{D}{T_0 \cdot V_m}, \qquad \text{Eq. 6(b)}$$

$$\xi_0 = \sqrt{1 - \left(\frac{V_{tis}}{V_m}\right)^2 (1 - \eta_0^2)} \qquad \text{Eq. 6(c)}$$

If the thickness D of the medium 26 does not change, the separately calculated values may be fixed, and if D changes, the calculated values can be provided as a table. This processing may be included in the calculation at initialization.

(Error Correction)

Generally, if calculation is recurrently performed using the approximate recurrence relations, errors due to approximation accumulate, and errors increase as the depth increases. In order to avoid this, the accumulation of errors may be corrected using reference recurrence parameters $\xi_m$ and $\eta_m$ and reference propagation time $T_m$, which are highly accurately calculated in advance at a predetermined reference depth $z_m$. By setting a plurality of reference depth values with an appropriate interval, errors are corrected periodically.

In order to determine $\xi_m$, $\eta_m$ and $T_m$ at reference depth $z_m$, the following quaternary equation is solved to obtain h first.

[Math. 7]

$$\frac{1}{V_{tis}^2} \cdot \frac{h^2}{h^2 + z_m^2} = \frac{1}{V_m^2} \cdot \frac{(x-h)^2}{D^2 + (x-h)^2}. \qquad \text{Eq. 7}$$

Using the smallest real-number root satisfying $0 \le h \le D$, out of the roots obtained here, the reference values $\xi_m$, $\eta_m$ and $T_m$ can be expressed as follows.

[Math. 8]

$$\xi_m = \frac{z_m}{\sqrt{h^2 + z_m^2}}, \qquad \text{Eq. 8(a)}$$

$$\eta_m = \frac{(D-h)}{\sqrt{(x-h)^2 + D^2}}, \qquad \text{Eq. 8(b)}$$

$$T_m = \frac{\sqrt{z_m^2 + h^2}}{V_{tis}} + \frac{\sqrt{(x-h)^2 + D^2}}{V_m}. \qquad \text{Eq. 8(c)}$$

In this way, high precision values at the reference depth $z_m$ are determined in advance by numerical calculation, and once the depth of focal point reaches the reference depth $z_m$, the recurrence relation calculation is continued thereafter, using $\xi_m$, $\eta_m$ and $T_m$ as the new initial values. The above mentioned calculations of the reference values, particularly the calculation of the quaternary equation, are complicated, but do not take much time since calculations are performed only for a relatively small number of reference depth values.

The reference propagation time may be determined by actual measurement. In concrete terms, ultrasonic pulses from a point sound source, such as a hydrophone, which is actually set at reference depth $z_m$, are received by each transducer using an ultrasonic apparatus. Then the reference propagation time $T_m$ may actually be measured based on the arrival time of the received pulses, so that the actually measured reference propagation time $T_m$ is used for correcting approximation errors. In this case, the reference recurrence parameters $\xi_m$ and $\eta_m$ are determined by solving Eq. 8(c) in reverse to determined h, and this h is substituted in Eq. 8(a) and Eq. 8(b).

The reference propagation time $T_m$ is a quantity used for correction, so the number of the reference propagation time values $T_m$ can be much smaller than the number of ultrasonic wave propagation time values $T_i$ at each interval dz of focal points, which are determined by the above mentioned approximate recurrence relations. Particularly when the value of the ultrasonic wave propagation time $T_i$ at each receive focal point is sequentially determined in the dynamic focus at reception, a smaller capacity is required for storing the reference propagation time $T_m$ and reference recurrence parameter values $\xi_m$ and $\eta_m$, compared with storing the ultrasonic wave propagation time values for all the receive focal points.

(Variations)

In the case of setting the initial depth $z_0$ to a value that is not zero, the initial values can be determined by the same method as determining the reference values. In other words, the root is determined for h in Eq. 7 regarding $z_m$ as $z_0$, and this h is used for calculating Eq. 8 or an actual measurement is used instead.

If the initial depth $z_0$ is set to a value that is not zero, the calculation can be progressed using the recurrence relation in a direction of the deeper depth of focal point, or in a direction of the shallower depth of focal point. If the calculation is progressed using the recurrence relation in a direction of the shallower depth of focal point, the calculation using the recurrence relation is stopped when the depth $z_i$ becomes a negative value. If the depth $z_i$ becomes a negative value, this means that the focal point 21 is in the medium 26, and in this case, calculation should be switched to the calculation of the propagation time used when the sound velocity is uniform, that is the same as conventional art.

In the above description, the interval dz of the focal points is fixed in each step of the recurrence relation, but may be changed in each step of the recurrence relation if the interval of the focal points is common for all the transducers. Particularly as the depth becomes deeper, the change amount $dT_i$ of the ultrasonic wave propagation time decreases and approximation accuracy increases, so more calculation processing can be omitted by increasing the absolute value of dz as the depth becomes deeper.

(Advantage of this Calculation)

The above mentioned recurrence relation is described as a rational polynomial of recurrence parameters, and the calculation thereof includes only four arithmetic operations, and does not include such operations as a transcendental function and square root extraction, therefore the computing processing can be easily installed as a digital circuit. Particularly this digital circuit can be easily packaged without installing a general purpose CPU or without using a general purpose PC. This digital circuit may be packaged using an MPU or GPU.

The above mentioned recurrence relation can be sequentially calculated using only parameter x and the initial values $\eta_0$, $\eta_O$ and $T_0$ which depend on each transducer, and a parameter $\gamma$ and interval dz focal points, which are common for all transducers. In other words, it is not necessary to use the computing results of the other transducers during recurrence calculation, thus each transducer can execute this calculation in parallel. Therefore image generation execution processing can be executed at high-speed by applying this calculation to parallel beam forming processing for each channel, which is performed by a conventional ultrasonic image diagnostic apparatus.

In the case of determining the ultrasonic propagation time in sequence in the direction of the deeper depth of focal point, in particular, this configuration are suitable when the focal points of a receive beam is adjusted while sequentially moving the receive focal point to the deeper direction corresponding to the propagation timing of the transmitted ultrasonic pulse.

<Dynamic Receiving Focus>

Now a case of performing the dynamic receiving focus using the ultrasonic pulse echo method will be described. In the ultrasonic pulse echo method, an ultrasonic pulse is transmitted first. The transmitted ultrasonic pulse travels through the medium. At the same time, an ultrasonic echo, which is reflected at each location as the ultrasonic pulse travels, propagates through the medium and reaches each transducer as mentioned above. The ultrasonic echo is received by each transducer appears after elapse of the traveling time of the transmitted ultrasonic pulse from the transmission of this ultrasonic pulse to each reflection point, and the ultrasonic wave propagation time for the reflected ultrasonic echo to propagate from each reflection point to each transducer. Therefore each reflection point provides this delay time, that is a total of the traveling time of the transmitted ultrasonic pulse and the ultrasonic wave propagation time of the ultrasonic echo, for each received signal of each transducer, and a delay-and-sum signal focused on each point is obtained by adding these received signal values. A one-dimensional medium reflection intensity distribution in the depth direction is obtained by arraying the delay-and-sum signal at each point along the traveling direction of the transmit pulse. Then a two-dimensional reflection intensity image on the reflection intensity of the medium is obtained by changing (scanning) the transmission position of the transmit pulse and the position of the receive transducer. In this way, when the dynamic receiving focus is performed, each signal value is delayed according to the ultrasonic wave propagation time of each transducer, which is determined as above while changing the depth of the receive focal point 21 according to the traveling of the ultrasonic pulse, and the signal values are added. It is preferable that the added signal value becomes a time series addition signal by being arrayed in a time series according to the position of the transmitted ultrasonic pulse. This processing will be described next.

Figure 8A:
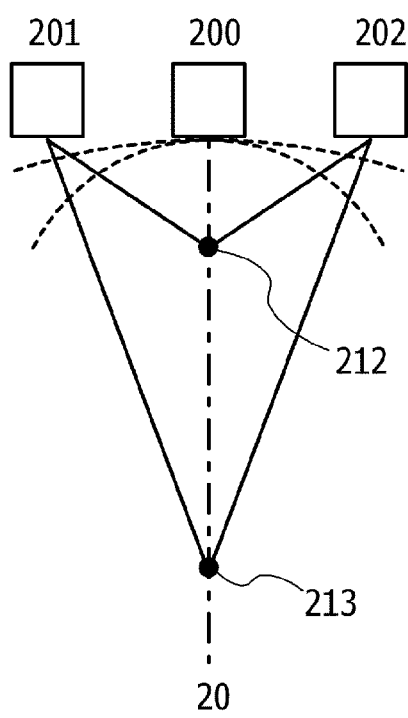
FIG. 8A is a diagram depicting the dynamic receiving focus.
Figure 8B:
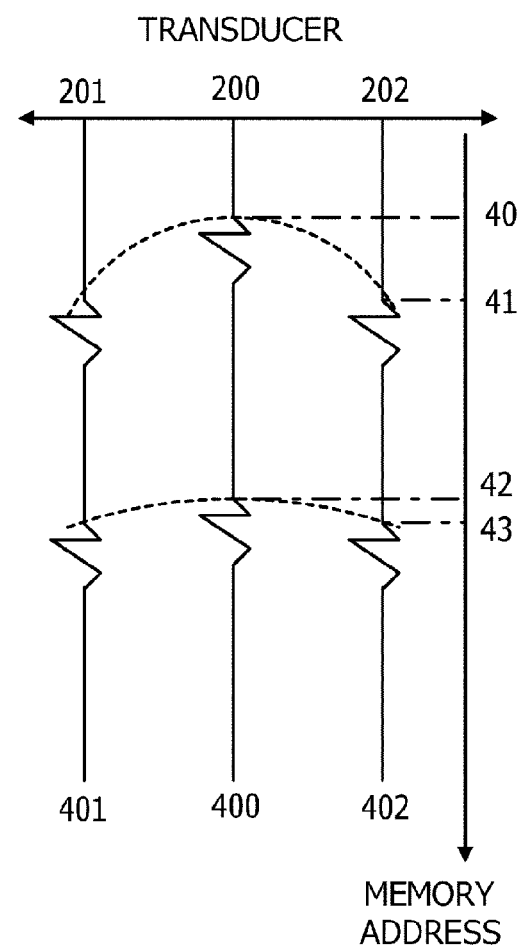
FIG. 8B is a diagram depicting the state of storing received signals in a memory.

An outline of the dynamic receiving focus will be described first with reference to FIG. 8. FIG. 8A shows a diagram depicting an outline of the receive focus, and FIG. 8B shows the state of storing received signals in a memory which stores a received signal of each transducer. To simplify explanation, only three transducers 200, 201 and 202, and two receive focal points 212 and 213, are considered. A layer having a different sound velocity is omitted here. It is assumed that the transducers 201 and 202 are located symmetrically with respect to the transducer 200. The received signals obtained (output) from the transducers 200, 201 and 202 are denoted with 400, 401 and 402 respectively.

The received signals 400, 401 and 402 obtained from each transducer 200, 201 and 202 are processed as corresponding receive channels. Hereafter processing on each transducer is also referred to as "processing on each receive channel".

The received signals 400, 401 and 402, which were sequentially converted from the ultrasonic waves received by each transducer, are stored in a memory in time series, at addresses according to the time the ultrasonic wave was received. The ultrasonic echo depth increases in the sequence of the addresses. The ultrasonic echo signals from the receive focal point 212 are stored in the address position 40 in the case of the received signal 400, and in the address position 41 in the case of the received signals 401 and 402. In the same manner, the ultrasonic echo signals from the receive focal point 213 are stored, in the address position 42 in the case of the received signal 400, and in the address position 43 in the case of the received signals 401 and 402.

The address position 40 corresponds to the total of the time when the transmitted ultrasonic pulse propagates to the focal point 212 along the central axis 20, and the time when the reflected ultrasonic wave propagates from the focal point 212 to the transducer 200. The address position 41 corresponds to the total of the transmitted ultrasonic pulse propagates to the focal point 212 along the central axis 20, and the time when the reflected ultrasonic wave propagates from the focal point 212 to the transducers 201 and 202. These address positions are determined by adding the propagation time of the received ultrasonic wave, obtained by computing the above mentioned recurrence relation, to the propagation time of the transmitted ultrasonic pulse. For the transducers in symmetrical positions, such as the transducers 201 and 202, an address position can be calculated only for one of these transducers, since the propagation time of the received ultrasonic wave is the same.

In concrete terms, the address position $P_{addr}$ of each receive channel can be expressed as follows.

[Math. 9]

$$P_{addr}(i) = \frac{D}{V_m \cdot T_{clk}} + \frac{z_i}{V_{tis} \cdot T_{clk}} + \frac{T_i}{T_{clk}}. \qquad \text{Eq. 9}$$

Here i is an index to indicate the focal point of the dynamic receiving focus. $T_i$ is a value determined by the above mentioned approximate recurrence relation. $P_{addr}$ corresponds to an increment of the address position of the received signal stored in the memory immediately after transmission. The first term and second term in Eq. 9 correspond to the propagation time until the transmitted ultrasonic pulse reaches the focal point, and the third term corresponds to the propagation time when the receive ultrasonic wave reaches from the focal point to the transducer. The total of the signal values of the address positions for each receive channel concerning a specific i corresponds to a focal point of the corresponding dynamic receiving focus, that is, the reflection intensity at the transmitted ultrasonic pulse position at this point. By sequentially increasing the depth of the position of the receive focal point i according to the traveling of the transmitted ultrasonic pulse, the time series signals corresponding to the reflection intensity can be obtained according to the traveling of the transmitted ultrasonic pulse along the index i. Particularly in the present invention, $T_i$ is determined recurrently according to the depth, therefore calculation can be performed sequentially along the index i.

If the interval dz of focal points is set to a small value ($dz=V_{tis} \cdot T_{clk}$) to match the cycle of the clock frequency, and the initial value of the depth is set to a boundary of the medium 26 and the medium 27, $P_{addr}$ becomes as follows.

[Math. 10]

$$P_{addr}(i) = \frac{D}{V_m \cdot T_{clk}} + i + \frac{T_i}{T_{clk}}.$$ Eq. 10

By reading the received signal values stored in the memory sequentially according to i for each receive channel using i as a read number, and adding the received signal values for all the receive channels, a delay-and-sum signal in the medium 27 at the boundary is obtained. In more concrete terms, the ultrasonic wave propagation time $T_i$ from a focal point $z_i$ is determined for each transducer corresponding to the timing for the transmitted ultrasonic pulse propagates to the focal point $z_i$, and the address $P_{addr}$ is calculated. By reading and adding the values of the received signal from the calculated address positions for the received signals of each transducer, the delay-and-sum signal corresponding to the focal point $z_i$ is obtained. Since the interval dz of focal points matches the clock frequency, time series signals having high resolution in the depth direction according to the traveling of the transmitted ultrasonic pulse can be obtained with an interval roughly matching the clock frequency.

The address position $P_{addr}$ may be determined by the following recurrence relation, instead of Eq. 10.

[Math. 11]

$$P_{addr}(i+1) = P_{addr}(i) + dP_{addr}(i)$$
$$dP_{addr}(i) = 1 + \frac{dT_i}{T_{clk}}.$$ Eq. 11

Since the delay-and-sum signal in the medium 26 is obtained by a conventional delay control method, processing can be switched at the boundary of the medium 26 and the medium 27. In this case, i can be used as a read number in an area lower than the boundary.

It is preferable that the delay-and-sum time series signals of the dynamic receiving focus are arrayed in a time series according to the propagation timing of the transmission pulse.

In order to decrease the time of beam forming processing, it is preferable to calculate address positions in the sequence of deeper receive focus.

Particularly the delay-and-sum processing is executed according to the propagation timing of the transmitted ultrasonic pulse, so the read operation for the delay-and-sum processing can be started after securing a predetermined time lag according to the processing, while storing the time series received signals in memory. Thereby partial parallel processing becomes possible, and processing time of the beam forming in general can be decreased.

If the calculation of address position has been completed by a timing of receiving the ultrasonic signal from a target focal point, the delay-and-sum processing is executed simultaneously with reading the memory, which further increases speed. A possible method to implement this is calculating address positions in advance, but a memory to store the address positions is required. In particular, if a short interval of receive focal points is set in order to obtain high image resolution, a memory capacity to store many memory addresses is required. Whereas in the case of the present invention, the propagation time of the received ultrasonic wave is calculated recurrently by computing processing according to the depth of the receive focal point, so an address position can be calculated in parallel, synchronizing with the progress of the delay-and-sum processing. Therefore high-speed beam forming can be implemented without providing a memory for storing many memory-address values, except that a relatively small number of reference addresses for error correction are stored. Furthermore, major restrictions on the number of receive focal points due to the memory capacity to store the memory-address values is eliminated, so the dynamic receiving focus for higher density of receive focal points can be performed, and this advantage coupled with refraction correction implements high resolution.

Thus according to the present invention, addresses are sequentially calculated while increasing the depth of the receive focal point using a series of recurrence operations, whereby good quality images can be generated with a digital circuit configuration, which has no major additions to a conventional configuration, at high-speed, and with performing refraction correction, just like the prior art.

(Error Correction)

Figure 6:
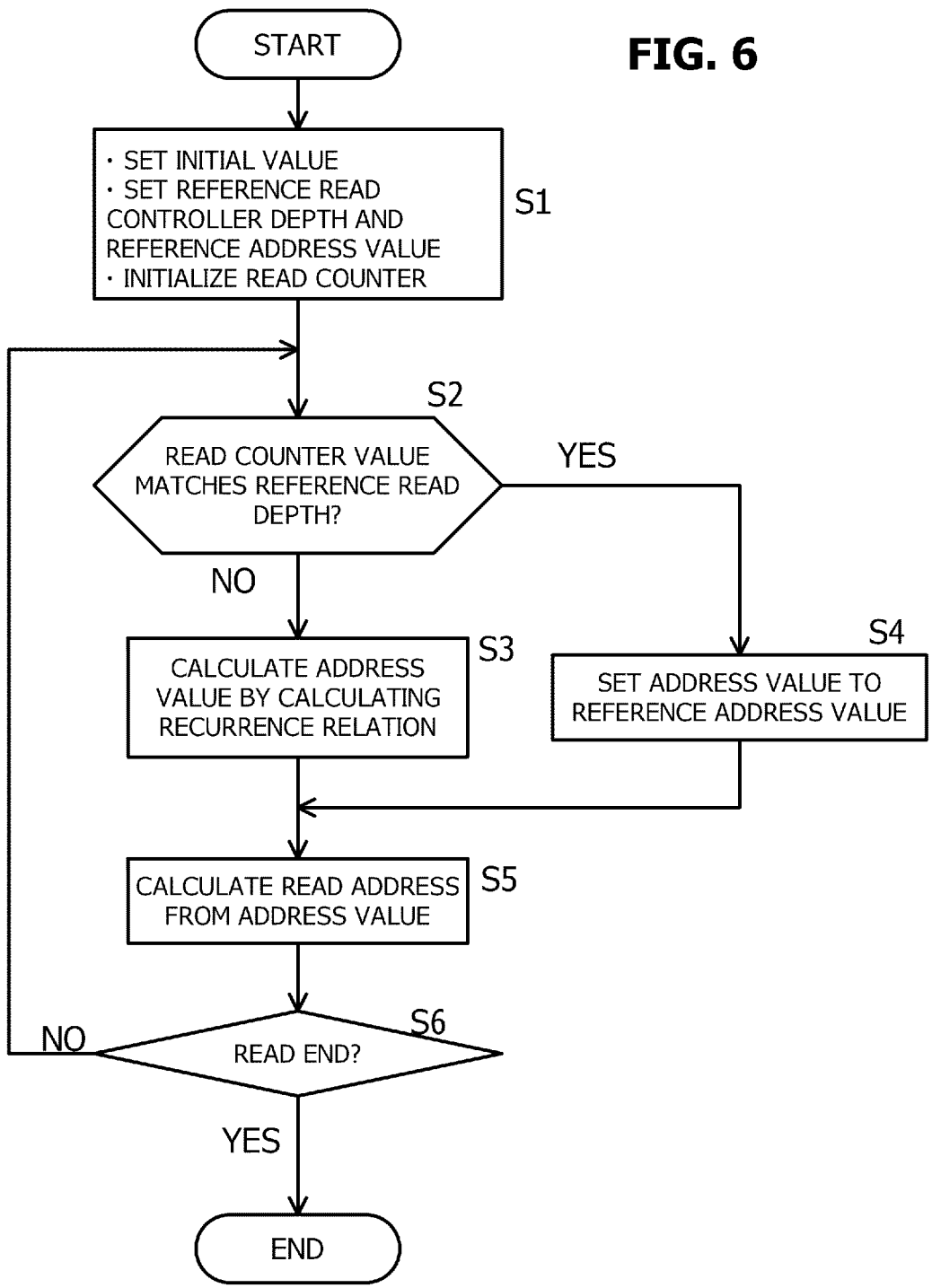
FIG. 6 is a flow chart of the memory address calculation processing.

In order to prevent the accumulation of errors in the approximate recurrence relation calculation as mentioned above, it is also preferable to include correction processing by reference propagation time at the reference focal point (reference depth). FIG. 6 shows an example of the memory address calculation processing which includes error correction in the dynamic receiving focus.

First in step S1, the initial values $\eta_0$, $\eta_0$ and $T_0$ of the recurrence relation are computed using Eq. 6, for example, and set. At the same time, a table comprised of the reference depth $z_m$, reference propagation time $T_m$, and reference recurrence parameters $\xi_m$ and $\eta_m$ for approximate error correction is read and set. Here the reference propagation time $T_m$ is written as an address value. The read counter corresponding to the depth is initialized.

Then it is determined whether the depth is a reference depth (step S2). If not the reference depth (S2: NO), $\xi_i$, $\eta_i$ and ultrasonic wave propagation time $T_i$ at this depth are computed by calculating the above mentioned recurrence relation, and the read address value is determined based on the ultrasonic wave propagation time $T_i$ (step S3). If it is the reference depth (S2: YES), the reference address value is determined based on the corresponding reference propagation time, and this value is set as the address value (step S4). At the same time, parameters of the recurrence relation are updated to the correction reference values $\xi_m$ and $\eta_m$.

An address of the actual memory is determined from the address value determined like this, and is used for the delay-and-sum processing of the receive beam forming (step S5). Then the read counter is incremented, and the depth is increased for the amount of the interval dz of the focal points (step S6). The address calculation processing is repeated until reaching the depth at which the read counter ends. Processing ends when the depth at which the read counter ends is reached.

In this way, an address position of the memory storing the received signal is determined in each receive channel each time the read counter increments. The received signal value at the address position determined like this is read, and these received signal values are added for all the receive channels, whereby the delay-and-sum processing of the dynamic receiving focus is performed.

<Other Calculation Scheme>

In the above description, the recurrence relation is calculated using Eq. 2, Eq. 3, Eq. 4 and Eq. 5. However a characteristic of the present invention is that the recurrence relation is calculated independently for each receive channel, which is not necessarily limited to the above mentioned equations. The effect of the above invention can be implemented if the address can be sequentially calculated by a series of recurrence operations for each receive channel as the receive focal point changes.

In other words, if the increment $dT_i$ of the ultrasonic wave propagation time $T_i$ with respect to the depth interval dz is determined without using the computing result of the other receive channels, like Eq. 3 to Eq. 5, and the result is recurrently added using Eq. 2, other expressions may be used. Therefore an equation other than Eq. 3, Eq. 4 and Eq. 5 may be used if it is an approximate expression with which each receive channel can independently calculate the increment $dT_i$ of the ultrasonic wave propagation time.

(Variation 1) Fixed Increment $dT_i$

In the case of performing the above mentioned approximate correction, a predetermined increment, between the reference depth values, can be used for each receive channel. In other words, if the depth $z_i$ satisfies $z_m \le z_i < z_{m+1}$, $dT_i$ may be $dT_i = \Delta m$. This processing will be described with reference to FIG. 6 again.

First at initialization (step S1), the initial values $\xi_0$, $\eta_0$ and $\eta_0$ are read, and a table comprised of the reference depth $z_m$, reference propagation time $T_m$, and reference propagation time increment $\Delta m$ is read. This reference data is set for each receive channel.

To calculate an address value at a location other than the reference depth (step S3), the propagation time $T_i$ is computed according to Eq. 2 ($T_{i+1} = T_i + dT_i$), and the address value is determined from this value. In this case, the reference propagation time increment $\Delta m$ at this time is used for the increment $dT_i$. To calculate an address value at the reference depth (step S4), on the other hand, the address value is determined from the reference propagation time $T_m$ at the reference depth.

Processing after this is the same as the above. In other words, the actual read address is calculated from the address value (step S5), the read counter value is incremented (step S6), and the processing is repeated until reading ends.

The reference propagation time increment $\Delta m$ can be any value which is set for each interval of each reference depth $z_m$, and for example, an inclination which fits a curve of the highly accurate ultrasonic propagation time calculated using Eq. 7 and Eq. 8 for each interval between each reference depth $z_m$. The change of the reference propagation time values $T_m$ and $T_{m+1}$ between two adjacent reference depths $z_m$ and $z_{m+1}$ may be utilized. In this case, the reference propagation time increment $\Delta m$ can be simply calculated from the adjacent reference propagation time value $T_m$ ($\Delta m = dz \cdot (T_{m+1} - T_m)/(z_{m+1} - z_m)$), so the reference propagation time increment $\Delta m$ need not be stored in the table.

In this example, the computing processing to determine the increment $dT_i$ can be omitted or simplified, so the computing processing size is small, and the digital circuits to be implemented can be dramatically omitted. On the other hand, the approximation accuracy drops compared with the case of using Eq. 3, Eq. 4 and Eq. 5, so the reference propagation time values $T_m$ at more reference depths $z_m$ are required, which increases the memory capacity to store data.

In the above example, the reference propagation time increment $\Delta m$ is used since the depth interval dz is constant, but the increase rate of the propagation time between reference depths should be used if the depth interval dz changes. In other words, the propagation time is determined by $dT_i = dz_i \cdot (T_{m+1} - T_m)/(z_{m+1} - z_m)$. In both cases, the ultrasonic wave propagation time increment between the reference depths is determined based on the change amount from the reference propagation time value in the adjacent reference depth.

(Variation 2) Approximation of Increment $dT_i$ Based on Polynomial of Depth

As a method between calculation using the approximate recurrence relation of Eq. 3 to Eq. 5 and calculation using linear interpolation, the propagation time increment $dT_i$ may be approximated using a polynomial of depth for each reference depth $z_m$.

[Math. 12]

$$dT_i^{(m)} = F^{(x)}(z_i - z_m) \qquad \text{Eq. 12}$$

Here $dT_i^{(m)}$ is an ultrasonic wave propagation time increment, which is used between the reference depth $z_m$ and the reference depth $z_{m+1}$. $F^{(x)}(z_i - z_m)$ is a polynomial of the difference $(z_i - z_m)$ between the depth $z_i$ and the reference depth $z_m$, and the coefficients thereof are determined for each receive channel and reference depth. The coefficients are calculated, for example, by fitting to the values determined using Eq. 7 and Eq. 8. Fitting may be performed based on the actually measured values of signals when an ultrasonic pulse is received from such a point sound source as a hydrophone.

In the processing flow shown in FIG. 6, each coefficient of the polynomial $F^{(x)}(z_i - z_m)$, in addition to the reference depth $z_m$ and the reference propagation time $T_m$ must be initialized or updated during initialization (S1) and during an update at the reference depth (S4). In this method, the coefficients of the polynomial must be stored for each reference depth, but compared with the case of setting the ultrasonic wave propagation time increment to be constant, approximation accuracy increases, so an advantage is that a number of reference depths can be low. Even though the approximation accuracy drops compared with the case of using Eq. 3, Eq. 4 and Eq. 5, an advantage here is that the calculation of the ultrasonic wave propagation time increment $dT_i$ can be simplified.

(Other Variations)

The method for approximating the ultrasonic wave propagation time increment $dT_i$ can be any method if the ultrasonic wave propagation time increment can be expressed with a small number of parameters, and can be simply represented by numerical values, and if a spline function, wavelet function, various orthogonal function expansions or the like can be used instead of a polynomial. In any case, parameter fitting is performed for the calculated values using Eq. 7 and Eq. 8 or actually measured values between adjacent reference depths, and the parameters are updated during update at a reference depth, in the same manner as mentioned above, and approximate functions specified by parameters can be used for the recurrence relation expression 2 between the reference depths.

In the above description, an example of applying the present invention to the memory address calculation for beam forming during reception was mainly shown, but the present invention may be applied to beam forming during transmission to control delay.

The above description, an example of the ultrasonic echo diagnostic apparatus which generates an image by irradiating an ultrasonic wave onto a subject and receiving a reflected ultrasonic wave (echo) thereof, was mainly shown. However the present invention can also be applied to a photoacoustic imaging apparatus which generates an image by irradiating a pulsed light onto a subject and receiving a photoacoustic wave (ultrasonic wave) generated by the photoacoustic effect, since similar receive beam forming is required.

Also in the above description, a case when there is one intervening plate or one layer of which sound velocity is different was shown, but a number of such layers may be two or more. The present invention can also be applied to the case when such a layer of which sound velocity is different does not exist.

Example 1

A case of applying the present invention to an ultrasonic image diagnostic apparatus will now be described in detail using an example.

<General Configuration>

An ultrasonic image diagnostic apparatus (ultrasonic echo diagnostic apparatus) according to this example will now be described with reference to FIG. 1.

Figure 1A:
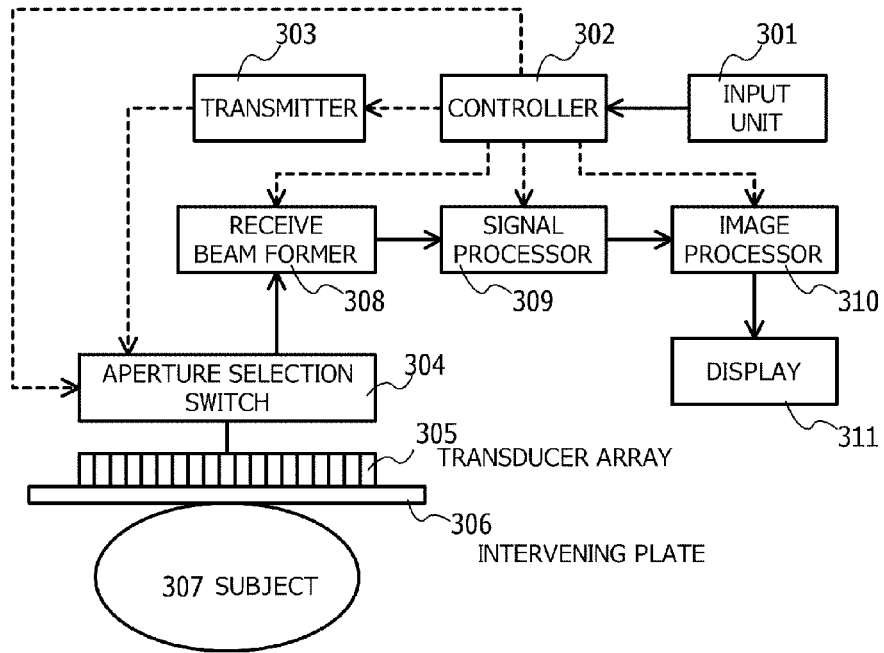
FIG. 1A is a diagram depicting an ultrasonic imaging apparatus according to Example 1.
Figure 1B:
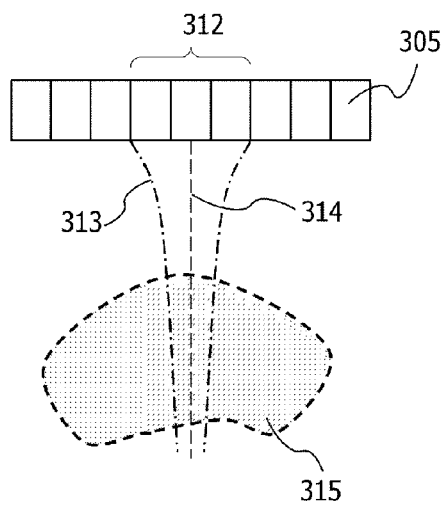
FIG. 1B shows an ultrasonic beam used in the ultrasonic imaging apparatus according to Example 1.
Figure 1C:
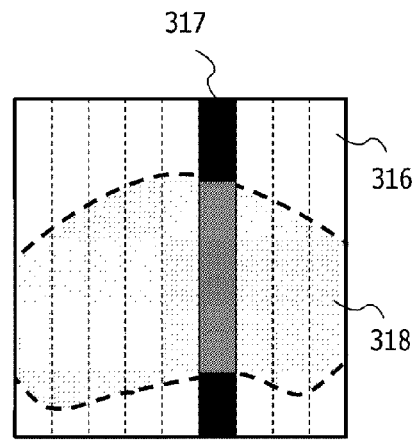
FIG. 1C shows image data generated by the ultrasonic imaging apparatus corresponding to the ultrasonic beam shown in FIG. 1B.

FIG. 1A shows a configuration of an ultrasonic imaging apparatus according to this example. FIG. 1B shows an ultrasonic beam used in the ultrasonic imaging apparatus according to this example. FIG. 1C shows an image or image data generated by the ultrasonic imaging apparatus corresponding to the ultrasonic beam shown in FIG. 1B.

In FIG. 1A, reference numeral 301 indicates an input unit, 302 indicates a controller, 303 indicates a transmitter, 304 indicates an aperture selection switch, 305 indicates a transducer array, 306 indicates an intervening plate, 307 indicates a subject, and 308 indicates a receive beam former. 309 indicates a signal processor, 310 indicates an image processor and 311 indicates a display.

The input unit 301 is for inputting various parameters, based on the conditions to capture an image of the subject, into the controller 302, and is constituted by standard switches and volumes, or keyboard or the like. The parameters to be input are the same as a standard ultrasonic image diagnostic apparatus, but the characteristic parameters of this example to be input are a thickness and sound velocity of the intervening plate 306, and the sound velocity of the subject 307. In the case of constructing this ultrasonic imaging apparatus as an ultrasonic mammography, where a compression plate for securing a breast, which is the subject 307, is used as the intervening plate 306, the thickness and sound velocity of the intervening plate 306 are already known and fixed in the apparatus. In this case, these parameters may be stored in advance in a non-volatile memory in the controller 302, for example. For the sound velocity of the subject 307, a value may be selected out of several types of values stored in advance, or a representative value stored in advance may be used, depending on the area of the subject 307 to be imaged.

The controller 302 initializes the ultrasonic imaging apparatus and performs various settings based on the parameters being input, and then controls each of the other units. The controller 302 first sends a transmission control signal to the transmitter 303, generates a transmitted ultrasonic drive pulse in which a transmission delay is added, and uses the aperture selection switch 304 at the same time to select a transmit/receive aperture and to switch it to the transmission side. Then immediately after the transmission of the ultrasonic pulse from the transducer array 305 ends, the controller 302 switches the aperture selection switch 304 to the reception side. Then the controller 302 controls processing of the receive beam former 308 and signal processor 309, newly selects a transmit/receive aperture using the aperture selection switch 304, and scans the ultrasonic transmit/receive beam by repeating the above control operation. When one frame of scanning ends, the controller 302 controls the image processor to create a frame image.

The transmitter 303 generates a transmission drive pulse for driving each transducer on the transducer array 305 and generating ultrasonic waves, based on the transmission control signal from the controller 302. At the same time, the transmitter 303 adds delay corresponding to a transmission focal point and a position of each transducer on the transducer array 305 to the transmission drive pulse of each transducer in order to generate a transmission converged beam. Also as mentioned later, the transmitter 303 generates a transmission drive pulse and delays this pulse only for the transducers selected by the aperture selection switch 304, in order to create an aperture for transmission.

The delay added here is for convergence of the transmission beam. In transmission, a pulsed ultrasonic wave is instantaneously transmitted, so normally only one focal point can be set. Therefore a number of groups of delay time values to be set is kept low, and the memory volume does not increase much even if each delay time value is stored in the controller 302. Hence a pre-calculated refraction correction delay amount can be stored in the controller 302, and be used for a focal point.

Convergence of the transmission beam does not influence the image quality compared to convergence of the receive beam, so conventional delay control processing, which does not correct refraction, may be performed. In this case, delay can be controlled by simple computing processing, so apparatus configuration is simplified, but the delay amount calculation using the following average sound velocity approximation is particularly effective.

[Math. 13]

$$\Delta T(f, D, x, V_{tis}, V_m) = \left( \frac{\sqrt{(1-D/x)^2(x^2+f^2)}}{V_{tis}} + \frac{\sqrt{D^2 + (xD/f)^2}}{V_m} \right) - \left( \frac{f-D}{V_{tis}} + \frac{D}{V_m} \right). \quad \text{Eq. 13}$$

Here $V_{tis}$ a sound velocity in the subject 307, $V_m$ is a sound velocity in the intervening plate 306, D is a thickness of the intervening plate 306, and f is a transmission focal distance which is a depth from the transducer array 305 to the transmission focal point. These are either input from the input unit 301 as input parameters, or partially stored in the controller 302 as predetermined values if these values are unique to the device, such as the case of using the stationary plate as the intervening plate 306, which is a fixed plate. Symbol x is a position of a transducer on the transducer array 305 measured from the center of the transmission beam, and is determined by the interval of transducer elements on the transducer array 305 and the position of the element with respect to the center of the transmission beam. Using this expression, the delay amount in a desired transmission focal point position can be computed for each transmission channel corresponding to each transducer forming the aperture.

The above expression is for determining the delay time considering the difference of sound velocity values assuming that the ultrasonic waves propagate on the line connecting the transducer and the focal point. The influence of refraction is not considered, but the respective propagation time value in each medium having a different sound velocity has been approximately corrected. In particular, this expression, which is similar to the conventional way of determining delay time under uniform sound velocity conditions and does not generate much of an increase in computing amount, can be implemented by adding minor changes to a conventional delay calculation digital signal processing circuit. Performing this computing processing makes it unnecessary to store each delay time amount in advance.

The transmission drive pulse generated and delayed by the transmitter 303 is input to each transducer forming the transmission aperture on the transducer array 305 via the aperture selection switch 304, and the ultrasonic pulse is transmitted from each transducer.

The transducer array 305 has a plurality of transducers (transmitting/receiving elements). The transducers are one-dimensionally arrayed and can switch the focal point position of the transmit/receive beam by beam forming processing based on the delay control of the transmit/receive ultrasonic waves. The transducer array is for transmitting and receiving ultrasonic waves, and serves as both an ultrasonic wave transmitter and ultrasonic wave receiver. The aperture selection switch 304 switches and connects each transducer on the transducer array 305, each transmit channel of the transmitter 303, and each receive channel of the receive beam former 308. Simultaneously with switching the transmission/reception of each transducer, the aperture portion is selected on the transducer array 305, and the aperture is shifted by switching the transducers to be selected, whereby the ultrasonic transmit/receive beam is scanned. A number of transducers forming the transmitting/receiving aperture is several tens of units, for example.

The scanning of the ultrasonic transmit/receive beam will be described with reference to FIG. 1B. To simplify explanation, the intervening plate 306 is not illustrated. An aperture 312 is formed using a part of the transducers (only three transducers are shown in FIG. 1B) on the transducer array 305. Ultrasonic waves transmitted from each transducer of the aperture 312 are combined, and the ultrasonic transmit beam 313 is formed. For reception, received signals obtained from each transducer of the aperture 312 are processed, whereby the ultrasonic receive beam 313 is formed in the same manner. The center of the ultrasonic beam 313 becomes an ultrasonic beam scanning line 314. By this ultrasonic transmit/receive beam 313, ultrasonic echo signals of the subject tissue 315 in an area along the ultrasonic beam scanning line 314 are obtained. The ultrasonic echo signal reflects an acoustic structure of the subject in an area along the ultrasonic beam scanning line 314, and a reflection signal appears in a time/position according to the depth as the ultrasonic pulse propagates.

By switching the aperture selection switch 304 and sequentially selecting transducers to constitute the aperture 312, the aperture 312 is shifted in the array direction of the transducer array. Thereby each ultrasonic beam scanning line 314 is moved in parallel, and cross-sectional data of the reflection signals of the ultrasonic waves, which reflects the acoustic structure of the subject, can be obtained.

In this example, the aperture 312 is shifted by switching the aperture selection switch 304 so as to perform ultrasonic beam scanning. A number of transmit channels which apply the drive pluses in the transmitter 303 and a number of receive channels which process received signals in the receive beam former 308 can be the same as the number of transducers constituting the aperture 312. In this way, this example has an advantage that a number of transmit channels and receive channels can be smaller than the total number of transducers of the transducer array 305, and the circuit configuration can be simplified. However a number of transmit channels of the transmitter 303 and a number of receive channels of the receive beam former 308 may be higher than the number of transducers of the aperture 312, or may be the same as the total number of transducers of the transducer array 305.

In the above description, the number of transducers of the aperture 312 is the same for transmission and reception, but the size of the aperture 312 may be changed between transmission and reception. In FIG. 1B, the ultrasonic beams for transmission and reception are commonly shown as the ultrasonic beam 313, but the form of the beam may be different between transmission and reception.

The ultrasonic pulses transmitted from the transducer array 305 are transmitted to the subject 307 via the intervening plate 306. The intervening plate 306 is approximately a plane parallel plate, and any medium can be used if the thickness and sound velocity thereof are known, and correction is required in delay control upon beam forming since the sound velocity is different from the subject 307. For example, the intervening plate may be an acoustic lens which converges ultrasonic waves in the array direction of the transducer array 305 and a direction perpendicular to the ultrasonic wave transmitting direction, or a matching layer for suppressing reflection of ultrasonic waves due to the difference of acoustic impedance between the transducer and subject 307. In this way, the intervening plate 306 may be a thin layer of which sound velocity is different from the subject 307. Alternatively, the intervening plate 306 may be a thick layer of which sound velocity is different from the subject 307, such as a stationary plate for securing the subject 307 or a standoff which is used when the subject 307 cannot directly contact the transducer array 305 because of the shape of the subject 307. The intervening plate 306 may also be a fat layer in the subject. In the case of a fat layer, the thickness of the fat layer is measured first by an image obtained by transmitting/receiving ultrasonic waves using a normal delay control without refraction correction, or using an average sound velocity of a normal fat layer. By inputting this data via the input unit 301 as the thickness of the intervening plate 306, a clear image with refraction correction can be obtained.

The ultrasonic pulses transmitted to the subject 307 after passing through the intervening plate 306 are reflected in each area in the subject 307, and the reflected ultrasonic wave is received by the aperture of the transducer array 305 again via the intervening plate 306. Each transducer on the aperture converts the received ultrasonic wave into electrical received signals, and each received signal is input to the receive beam former 308 by the aperture selection switch 304 which is switched for reception. The receive beam former 308 generates a delay-and-sum signal corresponding to the receive beam scanning line by addition, so as to form a receive beam from each received signal which is input, and outputs it to the signal processor 309. The signal processor 309 performs band filtering processing, phase detection processing, dynamic range conversion processing or the like, on a delay-and-sum signal, to generate a signal having brightness (intensity) corresponding to the reflection intensity of the ultrasonic wave, and inputs the signal to the image processor 310.

The above mentioned correspondence relationship will be described with reference to FIG. 1B and FIG. 1C. The reference numeral 317 in FIG. 1C designates a brightness signal sequence obtained from one receive channel. The brightness signal sequence 317 is generated by the ultrasonic receive beam 313 on the ultrasonic beam scanning line 314 in FIG. 1B via the receive beam former 308 and signal processor 309. The value of the brightness (intensity) on the brightness signal string corresponds to the reflection intensity of the ultrasonic receive beam 313, and a position on the brightness signal string corresponds to the depth of the reflected portion of the ultrasonic receive beam 313. One frame of the image data 316, which is a two-dimensional distribution of the ultrasonic wave reflection intensity on the cross-section of the subject 307, is constituted by a set of a plurality of brightness signal strings created by scanning of the transmit/receive beam. Particularly an image distribution 318 corresponding to the ultrasonic wave reflectance of each portion of the subject tissue 315 is generated.

To perform the above operation, the image processor 310 temporarily stores the brightness signal string, which is arrayed in a time series in a sequence according to the depth values which are input from the signal processor 309. The signal processor 310 stores a plurality of brightness signal strings according to the ultrasonic beam scanning, and performs scan conversion processing when one frame of scanning ends. The display 311 displays the image by raster scan, where the direction of the display scanning line is set in a lateral direction of the image, but the brightness signal string in a time series arrays in the depth direction, that is, longitudinal direction of the subject 207. Hence the image processor 310 performs the scan conversion processing so as to match the data array with the display scanning of the display 311. At the same time, the image processor 310 also performs various interpolation processing, coordinate transformation processing, and image filtering processing, among other processings, to match the data of the brightness signal string with pixels of the display unit. Here only the basic operation of the image processor 310 was shown to simplify description, but various operations for improving image quality may be added, and differences in detail of the operations should not interfere in applying the present invention.

In addition to the image display data generated by transmitting/receiving ultrasonic waves, as mentioned above, the image processor 310 may combine various data and output it to the display 311 as image display data. Examples of such data are: each parameter stored in the controller 302; various information effective for observing an image of a subject 307, such as a scale; and display data to assist input.

The display 311 may be a CRT, a liquid crystal display or the like, which displays images which are output from the image processor 310.

By repeating the above operation, a tomographic image of the subject 307 is displayed on the display 311 in near real-time.

<Receive Beam Former>

Now the receive beam former 308, which performs dynamic receiving focus, will be described with reference to FIG. 2.

An A/D convertor with amplifier 11 amplifies the received signal output from the aperture selection switch 304, and digitizes the signals using the clock frequency. A memory 12 stores the output digital signal from the A/D convertor with amplifier 11. The received signals which were sequentially digitized according to the clock frequency are stored in the memory 12 as discrete time series signals corresponding to the receive time. A read address calculation unit 13 calculates a read address corresponding to the propagation time at each receive focal point of each received signal to perform the dynamic receiving focus. A memory read controller 14 reads a digital signal value in the memory 12 using a read address value from the read address calculation unit 13. This read operation is executed corresponding to the transmit pulse propagation timing, and received signal amplitude values, focused for each receive depth are output to each receive channel. An adder 15 adds these signal values, whereby the dynamic receiving focused delay-and-sum signal is obtained, which is output to the signal processor 309. The A/D converter with amplifier 11, memory 12, read address calculation unit 13 and memory read controller 14 are provided for a number of receive channels, so that processings are executed in parallel and images are generated in real-time.

Figure 2:
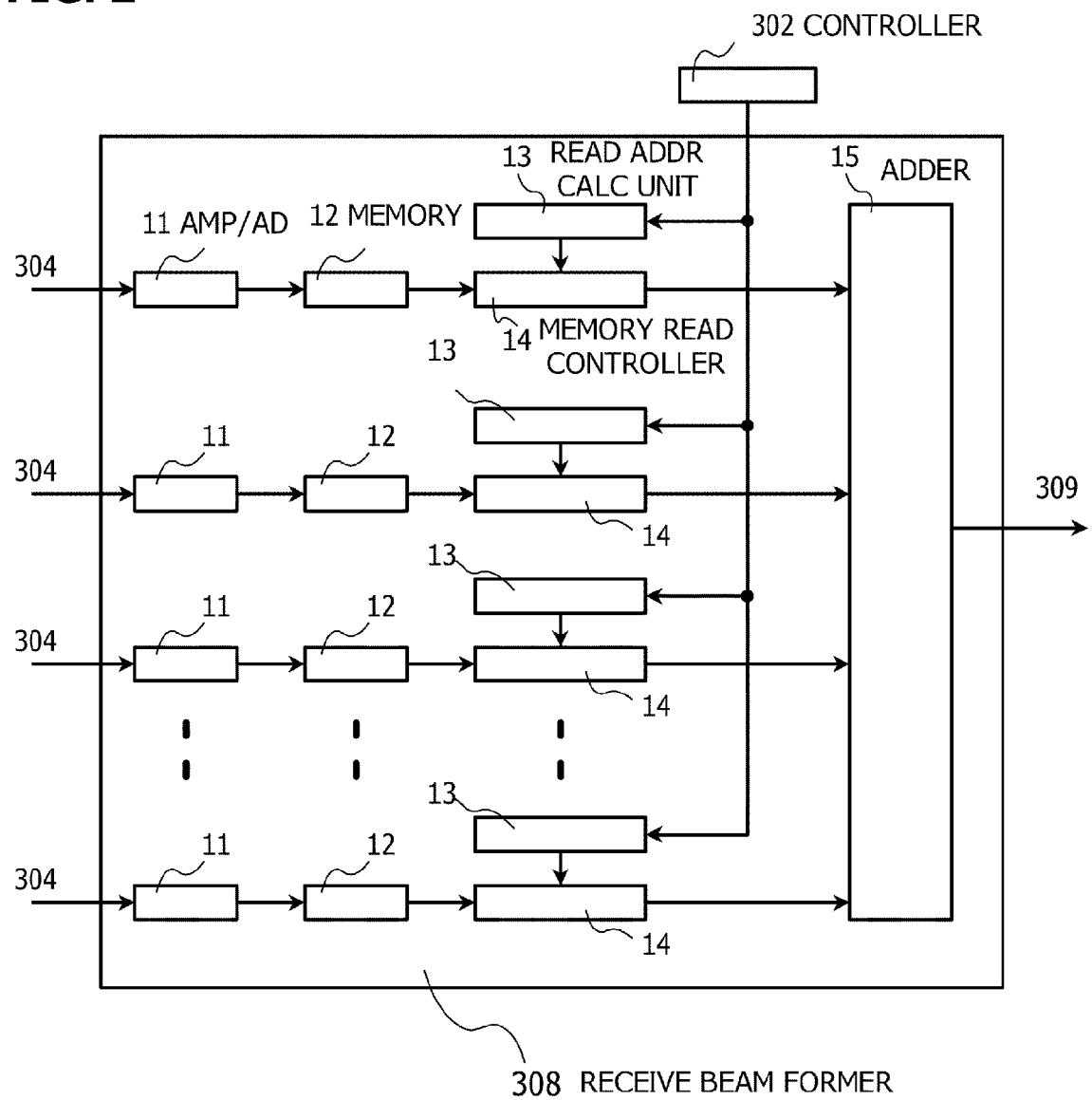
FIG. 2 is a diagram depicting a receive beam former according to Example 1.

In FIG. 2, the address calculation unit 13 is provided for all the receive channels. However if the configuration of the transducer array 305 is such that the transducers are disposed with equal intervals, and the transducers constituting the receive aperture are disposed symmetrically with respect to the center thereof, the propagation time is the same for the transducers disposed in symmetric positions. Therefore the address calculation unit 13 may be disposed only for one of the receive channels disposed in a symmetric positions in the receive aperture, so that the other shares this output value, then the circuit configuration can be simplified.

FIG. 2 shows an overview of each block when the receive beam former 308 is constituted by digital circuits. The read address calculation unit 13 and memory read controller 14 can be implemented using fixed digital circuits or programmable digital circuits such as FPGA. A computer having a standard processor (CPU) may be used instead. In the receive beam former 308, each receive channel performs delay processing in parallel, and forms a receive beam. The present invention can be regarded as such a delay control method. If the receive beam former 308 is constituted by an FPGA or a CPU, this program can be regarded as the delay control program of the present invention.

<Read Address Calculation Unit>

Figure 3:
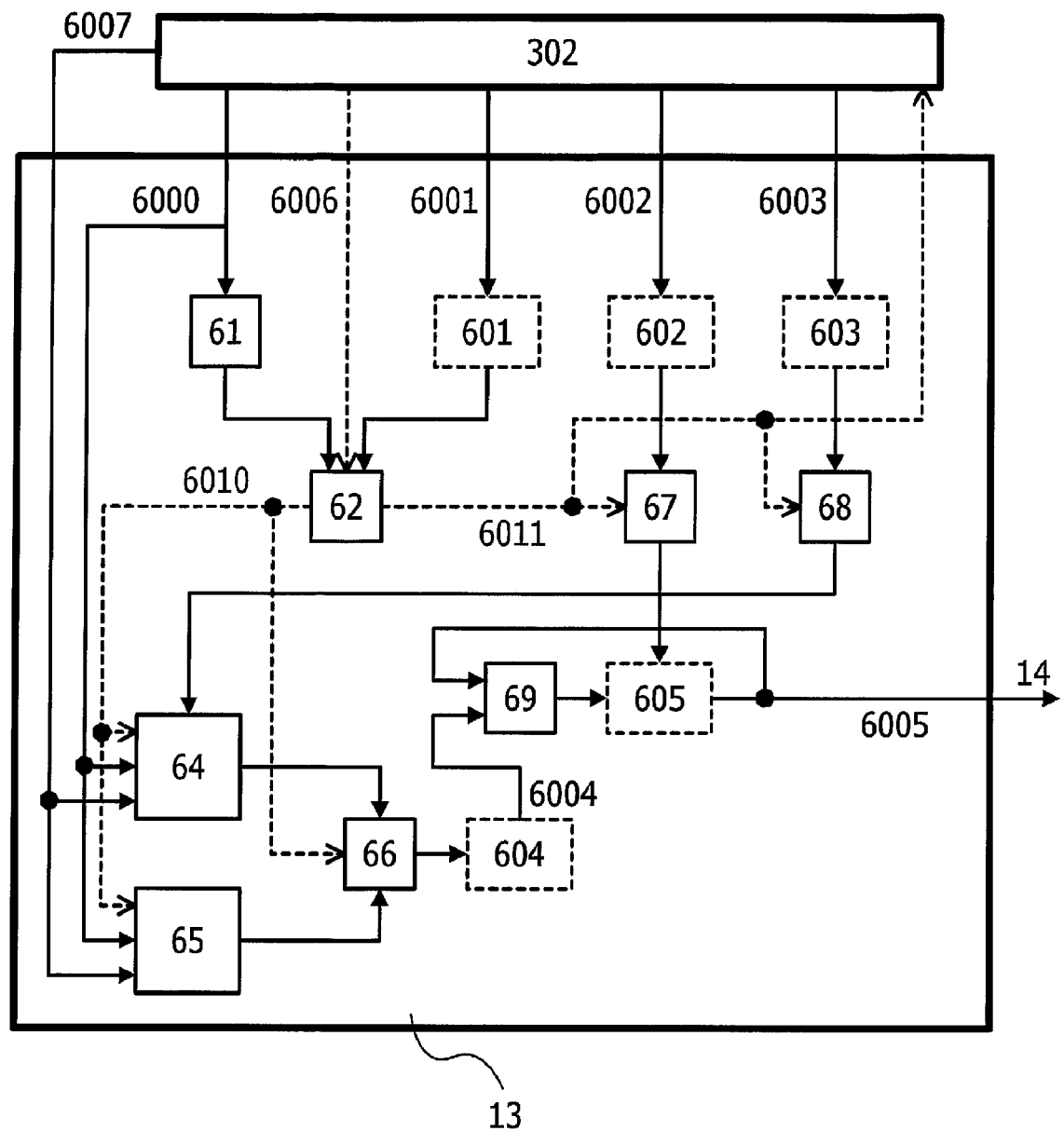
FIG. 3 is a diagram depicting a read address calculation unit according to Example 1.

Now the read address calculation unit (memory address calculation unit) 13 will be described in detail with reference to FIG. 3. FIG. 3 shows an overview of each block when the read address calculation unit 13 is constituted by digital circuits. The configuration in FIG. 3 is an example of process with calibration at a plurality of reference depths (reference focal points) based on the reference propagation time, as mentioned above, when the read address is recurrently calculated. In this example, the receive focal point interval in the dynamic receive beam forming is set corresponding to the cycle of the system clock frequency, which is used for synchronizing processings in the ultrasonic image diagnostic apparatus. The cycle of the system clock frequency corresponds to the time resolution of the digital received signals stored in the memory 12, and delay-and-sum processing in which focal points are matched in all the depths of the received signal can be performed by corresponding the interval of the receive focal points of the receive dynamic beam forming to the cycle of the system clock frequency. Thereby resolution of images generated in the ultrasonic imaging apparatus improves. Let dz be the interval of the receive focal points, and let $T_{clk}$ be the cycle of the clock frequency, then dz is given by $dz=V_{tis} \times T_{clk}$. The clock signal is also used for the reference of reading signals for the delay-and-sum processing.

The controller 302 outputs a clock signal 6000, reference depth clock value 6001, address calibration value 6002, parameter value for calibration 6003, start/end control signal 6006, and address increment operation parameter 6007 to the read address calculation unit 13. Receiving these inputs from the controller 302, the read address calculation unit 13 outputs a read address value 6005 corresponding to the ultrasonic wave propagation time to a memory read controller 14.

The reference depth clock value 6001 is a reference depth measured at each cycle of the clock frequency. The clock counter 61 creates a clock cumulative value by accumulating the clock signal 6000, and counts the elapsed time at each cycle of the clock frequency.

The address calibration value 6002 is an address value at the reference propagation time corresponding to each reference depth clock value 6001. The parameter value for calibration 6003 is a parameter value for calibration corresponding to each reference depth clock value. The parameter values for calibration 6003 are reference recurrence parameters $\xi_m$ and $\eta_m$ if a series of recurrence operations are performed using the above mentioned Eq. 3, Eq. 4 and Eq. 5. If the reference propagation time increment Δm is used, the parameter value for calibration 6003 is the reference propagation time increment Δm converted into a clock count. If an approximate polynomial is used, the parameter value for calibration 6003 is a coefficient of the polynomial. These parameter values for calibration 6003 are stored as a lookup table, using the reference depth clock value as an index, in the controller 302. Values read from the lookup table of the controller 302 are stored in temporary memories 601, 602 and 603 respectively. The values read from the lookup table are updated by the controller 302 when the later mentioned reference depth control signal 6011 is transmitted to the controller 302. In the beginning of the lookup table, a scanning start clock value, a refraction correction start clock value, scanning initial address value and refraction correction initial address value are stored. Here the scanning start clock value is a clock value corresponding to a time to start the dynamic receiving focus. The refraction correction start clock value is a clock value corresponding to the time when the ultrasonic wave reciprocatively propagates the thickness of the intervening plate 306. The scanning initial address value is an address value corresponding to a time to start the dynamic focus, and the refraction correction initial address value is an address value corresponding to a time to start refraction correction. These address values are determined as a read clock timing and address value of the receive beam forming when normal delay control is performed with a uniform sound velocity, regarding that a receive focal point exists in the dynamic receiving focus start point in the intervening plate 306 and the edge of the intervening plate 306. In this way, clock count values to start the dynamic receiving focus and the refraction correction, and initial address values thereof can be specified.

The start/end control signal 6006 is a signal to control the start/end of the operation of the read address calculation unit 13.

For an address increment computing parameter 6007, the computing parameters used for computing in the later mentioned uniform sound velocity address increment computing block 65 and refraction address increment computing block 64 are set in each block in advance by the controller 302. In concrete terms, sound velocities $V_{tis}$ and $V_m$, thickness D of the intervening plate 306, and intervals of the focal points of the dynamic focus or the like are set.

Now the address values used for this example will be described. An address for reading a signal stored in the memory 12 is an integer. However if an interval of the focal points of the dynamic receiving focus is set corresponding to the system clock, as in the case of this example, time corresponding to the ultrasonic wave propagation time is a real value. In this example, addresses are calculated recurrently, so if an address is written as an integer, a rounding error is generated in the address value. If a rounding error is generated, accuracy of the delay-and-sum time deteriorates, and the image resolution drops. To prevent this, according to this example, an address value is calculated in a real number form, which includes an integer portion and decimal portion. In other words, significant bits of an address value are used as an integer portion, and insignificant bits thereof are used as a decimal portion. The significant bit integer portion of the address value is called an "address value integer portion", and the insignificant bit decimal portion of the address value is called an "address value decimal portion". A number of bits of the address value decimal portion can be any value as long as the required accuracy is guaranteed, and is preferably 2 to 8 bits, although this depends on the clock frequency, the depth of the image to be captured, and the frequency of the ultrasonic wave to be used.

The later mentioned memory read controller 14 performs interpolation using the address value decimal portion for the received signal values at two addresses generated by rounding real number addresses. Thereby time resolution corresponding to the cycle of the system clock frequency of the received signals stored in the memory 12 is interpolated, and highly accurate delay-and-sum processing can be performed, and resolution is further improved coupling with the effect of the dynamic receiving focus matching the cycle of the system clock frequency. In this way, an address value used inside the read address calculation unit 13 is a real number address value including the address calibration value 6002 obtained from the lookup table of the controller 302. This is also true for the address values used in the following description.

Now each block of the address calculation unit 13 will be described along with the operation of the entire (apparatus).

After the reference depth clock value 6001 and the address calibration value 6002 are transmitted from the controller 302 and set in the temporary memories 601 and 602, the start/end control signal 6006 is transmitted from the controller 302 at the timing of the start. When the start/end control signal 6006 is received, a comparator 62 outputs the increment computing control signal 6010 which instructs the uniform sound velocity address increment computing block 65 to start operation. The comparator 62 sets a switch 66 so as to output the uniform sound velocity address increment computing block 65 to the temporary memory 604.

If the clock cumulative value of the clock counter 61 matches the reference depth clock value 6001 (scanning start clock value in this case) in the temporary memory 601, the comparator 62 outputs the reference depth control signal 6011 to the switches 67 and 68 and the controller 302. The switch 67 stores the address calibration value 6002 (scanning initial address value at this point) in the temporary memory 605 by the input of the reference depth control signal 6011, and sets the address calibration value 6002 as the initial address value. Receiving input of the reference depth control signal 6011, the controller 302 updates the reference depth clock value 6001, address calibration value 6002, and parameter value for calibration 6003 in the temporary memories 601, 602 and 603. At this time, the refraction correction start clock value is stored as the reference depth clock value 6001 in the temporary memory 601, and the refraction correction initial address value is stored as the address calibration value 6002 in the temporary memory 602. The initial parameter of the refraction address increment computing is stored as the parameter value for calibration 6003 in the temporary memory 603.

The uniform sound velocity address increment computing block 65 computes the address increment value 6004 in the intervening plate 306 synchronizing with the clock signal 6000. As mentioned above, when the dynamic focus processing starts, the address increment value to be output from the uniform sound velocity address increment computing block 65 is output from the switch 66, and is stored in the temporary memory 604. An adder 69 adds the address increment value in the temporary memory 604, and the output address value, which was calculated at the previous clock and stored in the temporary memory 605, so as to calculate the output address value 6005. In this way, an address value corresponding to the depth of the receive focal point can be calculated recurrently and sequentially output, synchronizing with the clock signal 6000.

As time elapses, the receive focal point becomes deeper, and the receive focal point eventually reaches the boundary of the intervening plate 306 and the subject 307. At this time, the clock cumulative value of the clock counter 62 is a refraction correction start clock value. The comparator 62 outputs the increment computing control signal 6010 if the clock cumulative value matches with the reference depth clock value 6001 (refraction correction start clock value at this point) in the memory 601. The increment computing control signal 6010 here is for indicating the end of the operation of the uniform sound velocity address increment computing block 65 and the start of the operation of the refraction address increment computing block 64. The comparator 62 also is set such that the switch 66 outputs the output of the refraction address increment computing block 64 to the temporary memory 604. Hereafter the output of the increment computing control signal 6010 is stopped until the start/end control signal 6006 is input again.

If the clock cumulative value matches with the refraction correction start clock value, the comparator 62 outputs the reference depth control signal 6011 to the switches 67 and 68 and the controller 302. By the reference depth control signal 6011, the switch 67 stores the refraction correction initial address value in the temporary memory 602 to the temporary memory 605, and inputs the initial parameters of the refraction address increment computing in the temporary memory 603 to the refraction address increment computing block 64. The controller 302 receives the input of the reference depth control signal 6011, and updates the reference depth clock signal 6001, address calibration value 6002 and parameter value for calibration 6003 in the temporary memories 601, 602 and 603 to the next reference values stored in the lookup table.

The refraction address increment computing block 64 computes the address increment value with consideration of refraction due to the intervening plate 306, in synchronization with the clock signal 6000, and stores the value in the temporary memory 604. However just like the dynamic receiving focus in the intervening plate 306, the calculated address increment value is sequentially added to the address value in the previous clock, to determine the output address value 6005 as the depth of the receive focal point increases.

In this way, synchronizing with the clock signal 6000, an address value corresponding to the depth of the receive focal point can be recurrently calculated and sequentially output. If the clock cumulative value matches the reference depth clock value 6001 in the temporary memory 601, a temporary memory for correction is updated so that the same correction can be performed in the next reference depth as well. In other words, the reference depth clock value 6001, the address calibration value 6002 and the parameter value for calibration 6003 are updated to the next values stored in the lookup table of the controller 302. The above operation is repeated and the operation is stopped at a point when the end signal is received in the start/end control signal 6006.

The addition of the adder 69 with the output of the uniform sound velocity address increment computing block 65 or the refraction address increment computing block 64, and reading the output address value 6005 in the temporary memory 605 need not be executed for each increment of the clock, as long as values are in sync with the clock signal. If it takes time for computing processing in the uniform sound velocity address increment computing block 65 or the refraction address increment computing block 64, the addition/output operation may be executed every several clocks of the clock signal according to the computing time and output of each block. In this case, the reference depth clock value 6001 written in the lookup table in the controller 302 should be written in the timing matching this output operation.

In the above example of the address calculation unit 13, a case of advancing processing while executing calibration depending on the reference propagation time based on a plurality of reference depths was described. However if this correction is not performed, a part of the configuration can be simplified since calculation of ultrasonic wave propagation time and update of the corresponding address are not required.

The processing in the uniform sound velocity address increment computing block 65 can be the same as the conventional art, so description thereof is omitted.

<Refraction Address Increment Computing Block>

Figure 4A:
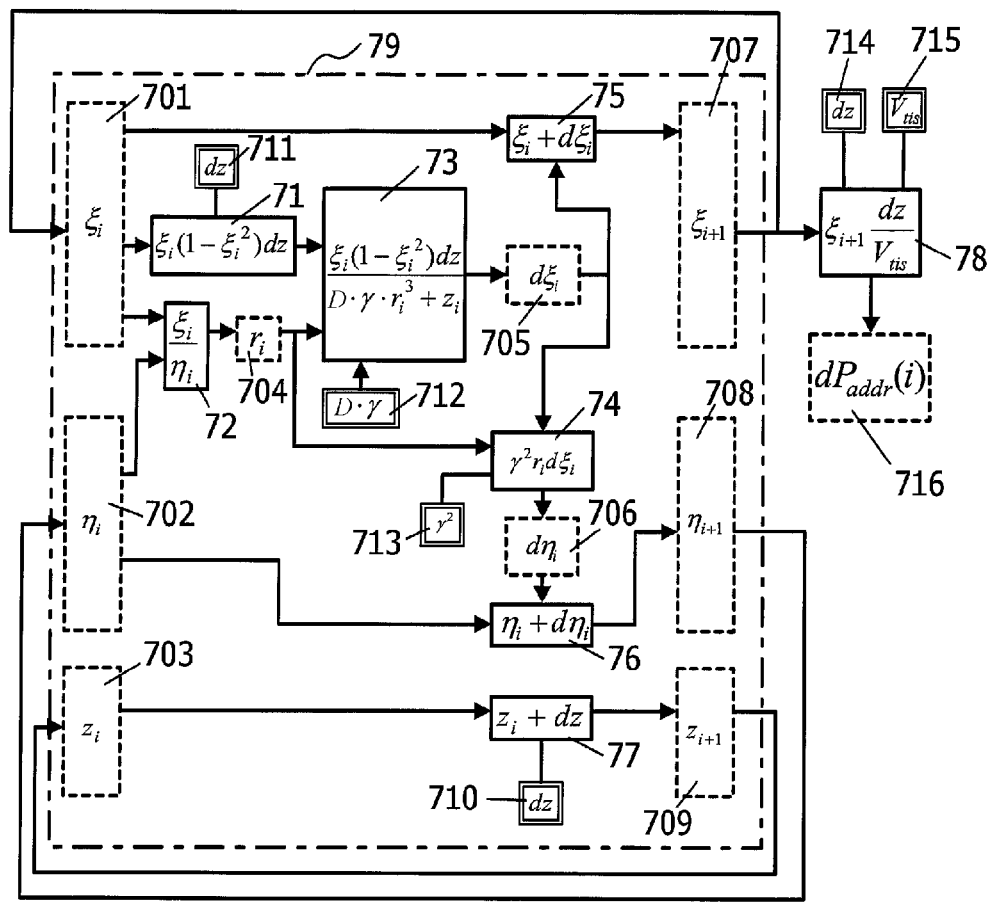
FIG. 4A is a diagram depicting a refraction correction address increment computing block according to Example 1.

Now an example of processing in the refraction address increment computing block 64 will be described with reference to FIG. 4. This example is for computing the recurrence relation using Eq. 3, Eq. 4 and Eq. 5. FIG. 4A shows an overview of the blocks for recurrence relation computing processing using Eq. 3, Eq. 4 and Eq. 5. Here a configuration, in which correspondence with the expressions is relatively easy to understand, is used to simplify explanation, but embodiments of the present invention are not limited to this configuration.

This block diagram is generally divided into computing sub-blocks which compute data (indicated by a solid line), temporary memories for storing values in the middle of calculation (indicated by a dotted line), and temporary memories for storing parameters which do not change in the middle of calculation (indicated by double lines).

The temporary memories 701, 702, 703, 704, 705, 706, 707, 708 and 709 store intermediate values in the middle of computing. These temporary memories are disposed mainly for matching timing of the processings in the middle of computing. These temporary memories include memories to make explanation easier for each variable of Eq. 3, Eq. 4 and Eq. 5, and particularly the temporary memories 704, 705 and 706, for example, may be omitted.

The temporary memories 710, 711, 712, 713, 714 and 715 store calculation parameters of which values do not change in the middle of a series of recurrence computing using the recurrence relations. These calculation parameters are provided by the controller 302 as the address increment computing parameter 6007 when the computing operation starts. These temporary memories in particular are hereinafter referred to as "parameter memories".

The computing sub-blocks 71, 72, 73, 74, 75, 76, 77 and 78 are portions where respective computing is performed, which are indicated as sub-blocks.

In the beginning of the recurrence operation, the values given as parameter values for calibration 6003 are stored in the temporary memories 701, 702 and 703. Using the values stored in the memory 701 and the values stored in the parameter memory 711, the computer sub-block 71 computes the numerator portion on the right hand side of Eq. 4(b), and outputs the result to the computing sub-block 73. The computing sub-block 72 computes the right hand side of Eq. 4(a) using the values stored in the temporary memories 701 and 702, and stores the result in the temporary memory 704. The computing sub-block 73 computes the right hand side of Eq. 4(b) using the output from the computing sub-block 71, the values stored in the temporary memories 703 and 704, and the value stored in the parameter memory 712, and stores the result in the temporary memory 705. The computing sub-block 74 computes the right hand side of Eq. 4(c) using the values stored in the temporary memories 704 and 705, and stores the result in the temporary memory 706. The computing sub-block 75 computes the right hand side of Eq. 3(b) using the values stored in the temporary memories 701 and 705, and stores the result in the temporary memory 707. The computing sub-block 76 computes the right hand side of Eq. 3(c) using the values stored in the temporary memories 702 and 706, and stores the result in the temporary memory 708. The computing sub-block 77 computes the right hand side of Eq. 3(d) using the value stored in the temporary memory 703 and the value stored in the parameter memory 710, and stores the result in the temporary memory 709.

The values stored in the temporary memories 707, 708 and 709 at this point are values where the recurrence calculation in the first step using the recurrence relation has completed. The values stored in the temporary memories 707, 708 and 709 are stored again in the temporary memories 701, 702 and 703, and the recurrent calculation in the second step are performed. At the same time, the value stored in the temporary memory 707 is input to the computing sub-block 78, where Eq. 3(a) is computed using the values stored in the parameter memories 714 and 715, to determine the propagation time increment after refraction correction. The result is then converted into an address by Eq. 11 or the like, so that the address increment value 6004 is obtained.

While sequentially executing the steps of the cyclic recurrence calculation, the address increment value 6004, when the receive focal point is deepening at the receive focal point interval of the dynamic receiving focus, is sequentially computed. The determined address increment value 6004 is stored in the temporary memory 604.

Figure 4B:
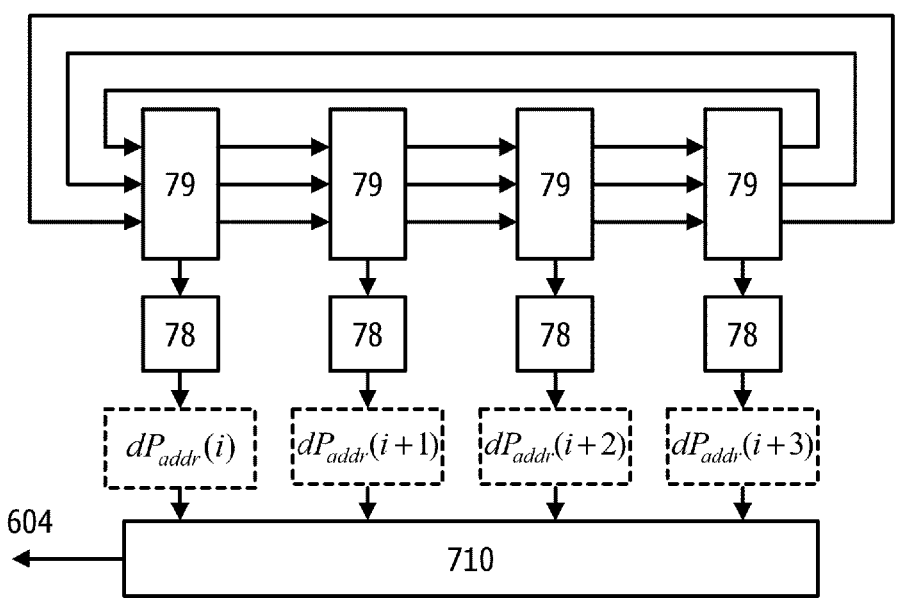
FIG. 4B is a diagram depicting a pipeline configuration for refraction correction address increment computation according to Example 1.

According to this example, if the computing volume in the refraction address increment computing block 64 is high and this computing is executed synchronizing with the system clock, computing processing may not be completed within a one clock cycle. In this case, the clock synchronization in each block must be adjusted in the address calculation unit 13. Furthermore the computing time of the address value becomes several times more than the system clock cycle, and thus the process slows down. In order to prevent this, the refraction address increment computing block 64 may be constituted by a pipeline, as shown in FIG. 4B. FIG. 4B shows a pipeline constituted by an FIFO memory 710 and a plurality of block portions 79, one of which is shown in FIG. 4A. Here the pipeline configuration has four stages, but the number of stages for the pipeline is set depending on the computing time of the block 79. In the pipeline processing, the processing starts before the timing required for reading the output of the adder 69, and the address increment value 6004, which was stored once in FIFO memory 710, is read at the processing timing of the adder 69, and is stored in the temporary memory 604. In this case, the initial values for the recurrence processing are required, so the parameter values for calibration 6003 in the temporary memory 603 should be read first.

This example of the refraction address increment computing block 64 is an example of executing the computing processing algorithm, and is an example in particular for assisting in understanding the description of the processing according to Eq. 3, Eq. 4 and Eq. 5, therefore the circuit configuration may be simplified by omitting or changing a part of the processing configuration.

Instead of using Eq. 3, Eq. 4 and Eq. 5, a reference propagation time increment $dT_i$ in which the address increment is partially constant, or a polynomial approximation may be used to simplify the processing of the refraction address increment computing block 64.

<Memory Read Control Unit>

Now an example of the memory read control unit 14 will be described with reference to FIG. 5. In this example, the memory read address is calculated as a real number, so the receive beam can be focused more accurately than the prior art. The memory read control to be described below is for utilizing this advantage effectively. In concrete terms, interpolation corresponding to the decimal address portion of the output address value 6005 is performed using two received signal values, which are continuous in time, and read from the memory 12. This allows calculation of which accuracy is finer than the time resolution of the received signals stored in the memory 12. The reading of received signals using received signal interpolation, which is explained below, is not essential for the present invention, and the interpolation method is also just an example, and actual interpolation computing processing is not limited to the following method, and two or more signal values may be interpolated, for example.

Figure 5:
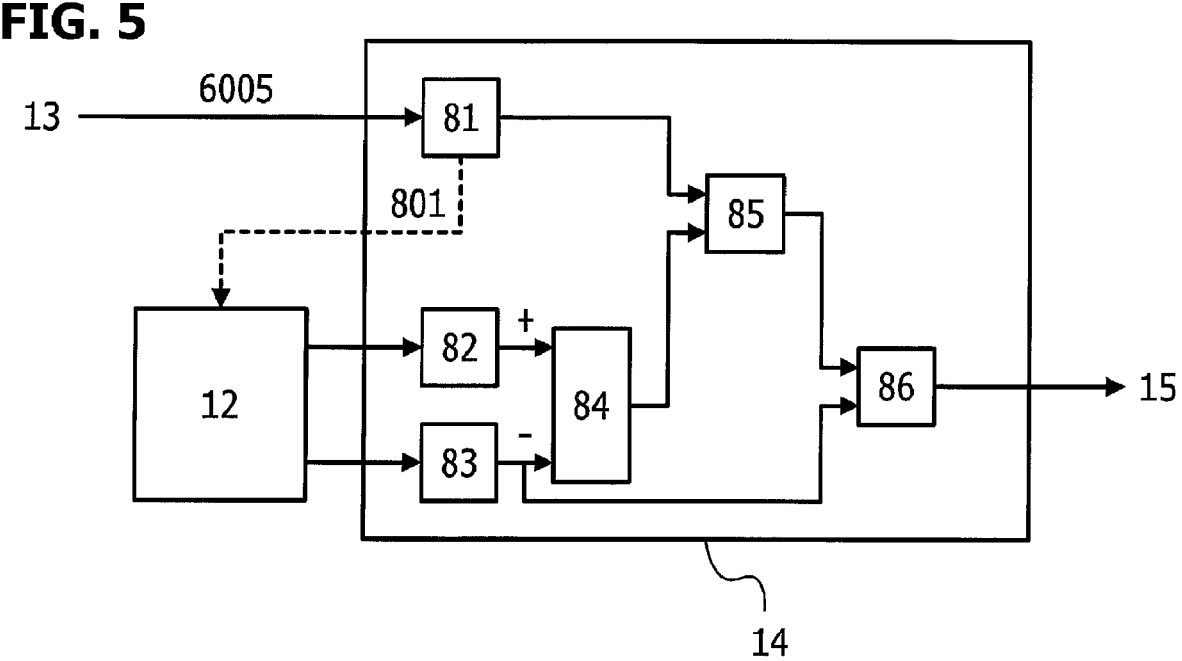
FIG. 5 is a diagram depicting a memory read controller according to Example 1.

The reference numerals 81, 82 and 83 in FIG. 5 indicate temporary memories, where the output address value 6005 from the read address calculation unit 13 and two continuous received signal values which are read from the memory 12 are stored. The temporary memories 81, 82 and 83 are not essential, but are disposed for synchronizing processings and for assisting in understanding the description here. The reference numeral 84 indicates a subtracter, 85 indicates a multiplier, and 86 indicates an adder.

The output address value 6005, which is stored in the temporary memory 81, consists of an address integer portion 801 which is a significant bit portion, and an address decimal portion 208 which is an insignificant bit portion. The address integer portion 801 is used for specifying and reading a signal value corresponding to a specific time, out of a time series digital received signals stored in the memory 12. For explanatory purposes, the address integer portion stored in the temporary memory 81 is denoted by n, and the address decimal portion is denoted by q herein below.

The received signal value at an address specified by the address integer portion 801 and a received signal value of the next address corresponding to the portion which is continuous in time are stored in the temporary memories 82 and 83 respectively from the memory 12. Here a received signal value stored in the temporary memory 82 is denoted by $S_n$, and a received signal value stored in the temporary memory 83 is denoted by $S_{n+1}$. The subscript n indicates a memory address specified by the address integer portion 801.

The subtracter 84 subtracts the received signal value $S_{n+1}$ stored in the temporary memory 83 from the received signal value $S_n$ stored in the temporary memory 82, and inputs the result to the multiplier 85. The multiplier 85 multiplies the output of the subtracter 84 by the address decimal portion q of the address value stored in the temporary memory 81, and inputs the result to the adder 86. The adder 86 adds the output of the temporary memory 83 and the received signal values $S_{n+1}$ stored in the multiplier 85, and outputs the result to the adder 15.

By the above computing the following expression is calculated.

[Math. 14]

$$S_n \cdot q + S_{n+1} \cdot (1-q).$$ Eq. 14

Thereby a value after interpolating the received signal values $S_n$ and $S_{n+1}$, which are adjacent in time, by the address decimal portion q, is output to the adder 15. In the memory 12, received signals are stored at time intervals determined by the interval of the system clock, but by this interpolation, a received signal corresponding to an ultrasonic wave propagation time value there between can be obtained. As a result, delay-and-sum processing can be performed at high precision without rounding the time accuracy of the target received signal values of the delay-and-sum processing operation depending on the cycle of the clock frequency.

Then the delay-and-sum is performed for the received signals of the receive channels by the above mentioned processing by the adder 15 and the later processing, and the ultrasonic tomographic image is displayed on the display 311 via the signal processor 309 and the image processor 310.

In this example, the scanning of the ultrasonic transmit/receive bean has been described as related to selecting a part of the transducers constituting the aperture of the transducer array 305 and the line scanning by shifting the transducers. This is for simplifying the description, and the entire transducer array 305 may be used as the aperture. In this case, the present invention may be applied to the ultrasonic image diagnostic apparatus based on a sector scanning method where the transmit/receive direction of the ultrasonic transmit/receive beam is changed using the transmit/receive control of each transducer. In this case, the position of the receive focal point can be set on the ultrasonic receive beam which spreads radially from the center of the transducer array 305, instead of a position directly under the center of the transducer array 305. The address position of the receive memory is sequentially determined recurrently using the approximate recurrence relation to determine the ultrasonic wave propagation time for each transducer or receive channel with respect to one of the ultrasonic wave receive beams in the sequence of depth of receive focal point becoming deeper. If delay-and-sum is performed for the received signal values of each transducer or receive channel which were read using this address position, the delay-and-sum converted signal with respect to the ultrasonic beam is obtained. By changing the direction of the ultrasonic receive beam and scanning the beam, the ultrasonic tomography image can be created and displayed, as mentioned above.

Example 2

Example 2 of the present invention is an ultrasonic imaging apparatus based on a photoacoustic imaging method using photoacoustic waves. According to the photoacoustic imaging method, an internal structure of the subject is imaged by irradiating a pulse layer beam onto a subject, and detecting an ultrasonic wave, which is a photoacoustic wave induced by thermal expansion.

A concrete procedure of the photoacoustic imaging method is disclosed as follows, in the Japanese Patent Application Publication (Translation of PCT Application) No. 2001-507952, for example.

(1) A two-dimensional transducer array (two-dimensional receiving element array) is positioned on the subject surface, and single pulsed electromagnetic energy is irradiated onto the subject.

(2) A receive photoacoustic signal of each transducer (each receiving element) is sampled and stored immediately after irradiation of the electromagnetic energy.

(3) Propagation time for the photoacoustic wave to reach a position r, from a point r' in the subject to be imaged, is calculated for the point r', and the signal of each transducer corresponding to the propagation time is added to obtain the image value of point r'.

(4) Step (3) is repeated for each point r' to be imaged.

Japanese Patent Application Laid-Open No. 2005-21380 discloses an apparatus in which both an image based on the photoacoustic imaging method and a normal ultrasonic echo image are alternately reconstructed using a common transducers.

In this way, according to the photoacoustic imaging method as well, it is necessary to calculate the propagation time of the photoacoustic wave from the photoacoustic wave generation point to each transducer, and add the receive photoacoustic signals in a time series with matching the phases using this calculated propagation time. Therefore if a layer in which sound velocity is different exists on the propagation path of the photoacoustic wave and refraction is generated, the phases of the receive photoacoustic signals do not match, and created image resolution drops, just like the case of the reception based on the ultrasonic pulse echo method. In this example, correction of the ultrasonic wave propagation time of this invention is applied to the photoacoustic imaging method, so that a drop in resolution of the image to be created is suppressed.

A three-dimensional image reconstruction method based on the photoacoustic imaging method will be described in detail with reference to FIG. 9.

Figure 9A:
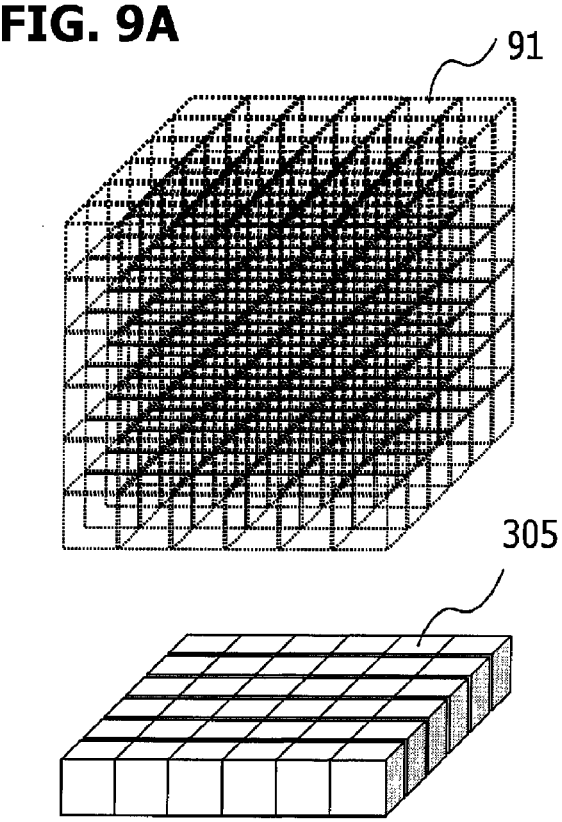
FIG. 9A is a diagram depicting a voxel data structure for three-dimensional image reconstruction according to the photoacoustic imaging method of Example 2.
Figure 9B:
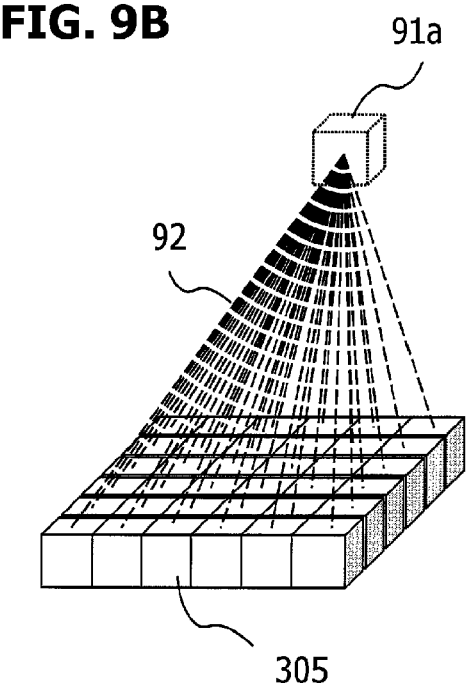
FIG. 9B is a diagram depicting a concept for creating data in the specific voxels in the photoacoustic imaging method of Example 2.
Figure 9C:
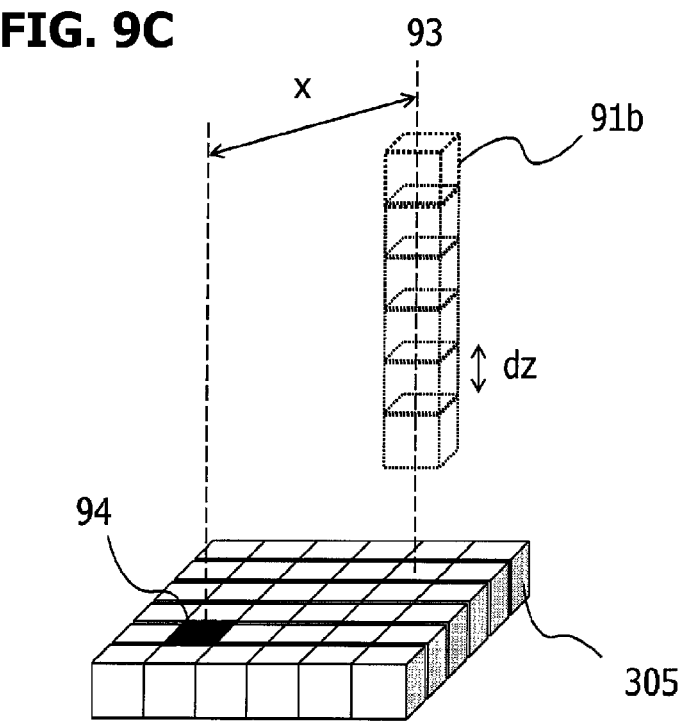
FIG. 9C is a diagram depicting a processing method according to Example 2.

FIG. 9A is a conceptual diagram depicting a voxel data structure for three-dimensional image reconstruction according to the photoacoustic imaging method. FIG. 9B is a diagram depicting a concept for creating data in the specific voxels in the photoacoustic imaging method. FIG. 9C is a diagram depicting a processing method according to this example.

In FIG. 9, the reference numeral 305 indicates a transducer array. Unlike the above mentioned ultrasonic echo method, a two-dimensional array is used to reconstruct the three-dimensional image. Further, in the photoacoustic imaging method, each transducer of the transducer array only receives an ultrasonic wave, which is a photoacoustic wave generated by laser irradiation.

In FIG. 9A, the reference numeral 91 indicates a three-dimensional voxel array. The data structure in which the imaging area in the subject is virtually sectioned in grating is referred to as a "voxel array". The grating structure corresponding to this data structure is called a voxel array, and a unit grating constituting the voxel array is referred to as a "voxel". The data group stored in the voxel data array is referred to as "voxel array data". In the three-dimensional image reconstruction based on the photoacoustic imaging method, the intensity of the photoacoustic wave generated in each voxel is evaluated, and is converted into image brightness as irradiated laser light absorption amount, and is stored in the voxel data array. Based on the image brightness data (brightness voxel array data) obtained like this, a three-dimensional image is displayed, or a tomographic image is reconstructed and displayed.

In FIG. 9B, the reference numeral 91a indicates a specific voxel in the three-dimensional voxel array 91. The reference numeral 92 indicates a photoacoustic wave propagation path from the voxel 91a to each transducer of the transducer array 305. The intensity of the photoacoustic wave generated in the voxel 91a is evaluated based on the receive photoacoustic signals in a time series received by each transducer of the transducer array 305. In other words, the amplitude value of the received signal in the portion corresponding to the propagation time from the voxel 91a to the transducer is determined for each transducer and is added, whereby the intensity of the photoacoustic wave generated in the voxel 91a is determined.

If the sound velocity of the subject is uniform at this time, the propagation time can be simply determined by the geometric positional relationship of the voxel 91a, and each transducer and the sound velocity of the subject. On the other hand, if an intervening plate having different sound velocity exists between the subject and the transducer array 305, or the surface area of the subject is a layer and the sound velocity thereof is different from the lower layer portion, then the propagation time, including the refraction effect, is determined by the processing based on the present invention.

Here an illustration of the intervening plate is omitted to simply drawings. In order to calibrate the change of the solid angle estimating a voxel 91a depending on the position of each transducer and the size and direction of the aperture, and to increase accuracy in an evaluation of the photoacoustic wave intensity generated in the voxel 91a, weighting may be performed when adding each transducer signal. Weighting considering angular directivity depending on the sensitivity distribution of the transducer itself may be performed. The details of these issues are secondary in relation to the present invention, which focuses on refraction correction performed on propagation time, required when an intervening layer of which sound velocity is different from the subject exists, therefore detailed description is omitted here.

An outline of the processing when the present invention is applied to the photoacoustic imaging method will be described with reference to FIG. 9C. The reference numeral 91b indicates a voxel column arrayed in the subject depth direction out of the voxel array 91. The reference numeral 93 indicates a central axis of the voxel column 91b. The central axis 93 of the voxel column stretches in the subject depth direction approximately perpendicular to the array plane of the two-dimensional transducer array 305.

The reference numeral 94 is an arbitrary transducer in the transducer array 305. Here it is assumed that the distance between the central axis 93 of the voxel column and the transducer 94, that is, the length of the perpendicular drawn from the transducer 94 to the central axis 93 of the voxel column, is x. Hereafter x is referred to as the "transducer-voxel column distance".

If the distance between each voxel of the voxel column 91b in the depth direction is regarded as the interval dz of focal points in the depth direction, and the transducer position x is regarded as the length of the perpendicular, then the propagation time T of the photoacoustic wave becomes the same as Eq. 1. Therefore if the propagation time is determined between the intervening plate of which sound velocity is different and the voxel on the interface of the subject is determined, the propagation time can be determined recurrently in sequence for each voxel of which depth becomes deeper by dz at a time along the central axis 93 of the voxel column, by determining the photoacoustic wave propagation time increment recurrently in sequence. In concrete terms, the photoacoustic wave propagation time values are computed recurrently in sequence using Eq. 2, Eq. 3, Eq. 4 and Eq. 5. Just like the above mentioned apparatus using the ultrasonic echo method, the initial photoacoustic wave propagation time can be determined as the case of uniform sound velocity. Using values computed by Eq. 7 and Eq. 8 for a voxel at an arbitrary depth as initial values, a photoacoustic wave propagation time value may be computed recurrently in sequence in a direction of shallower depth. Or in the middle of the recurrence computing, calibration for suppressing accumulation of approximation errors may be performed. For the approximation of the recurrence relation, polynomial approximation and an orthogonal function system may be used. These operations can be performed in the same manner as an apparatus using the ultrasonic echo method.

In this way, using the propagation time of the photoacoustic wave determined recurrently according to the depth, components of the photoacoustic wave intensity generated from each voxel on the voxel column 91b can be extracted out of the receive photoacoustic signals in a time series received by the transducer 94. The contribution of the photoacoustic signals generated from each voxel like this is added to the data of the corresponding voxel data array, and the result is stored again. Then the voxel string 91b is shifted and the same operation is repeated. By repeating this, the contribution of the receive photoacoustic signal, which are received by the transducer 94, can be added to each data of the voxel data array corresponding to the three-dimensional voxel array 91. By executing this operation for each transducer of the transducer array 305, added value of the receive photoacoustic signals, of which phases are aligned, can be obtained for each data of the voxel data array corresponding to the three-dimensional voxel array 91.

In the above description, the photoacoustic wave propagation time is calculated for all the combinations of the voxels and transducers to simplify explanation. But depending on the setting of the voxel array 91 and the setting of the interval of the transducers of the transducer array 305, a common propagation time calculation may be used. In other words, the propagation time is determined by the propagation path of the photoacoustic wave, and is determined by a geometric positions of each voxel, each transducer and the intervening plate. For example, a propagation time for a set of a transducer and voxel is the same as a propagation time of a set of the transducer and voxel in positions shifted in parallel for a same amount. Considering this, it is preferable that the interval of the voxels disposed on a plane in parallel with the two-dimensional array surface of the transducer and the interval of the transducers are matched or in a ratio of integers. Then the sequence of the photoacoustic wave propagation time values determined by recurrently calculating in the depth direction for a combination of a specific transducer and a voxel column 91b can be directly applied to another combination in a same positional relationship.

Figure 10A:
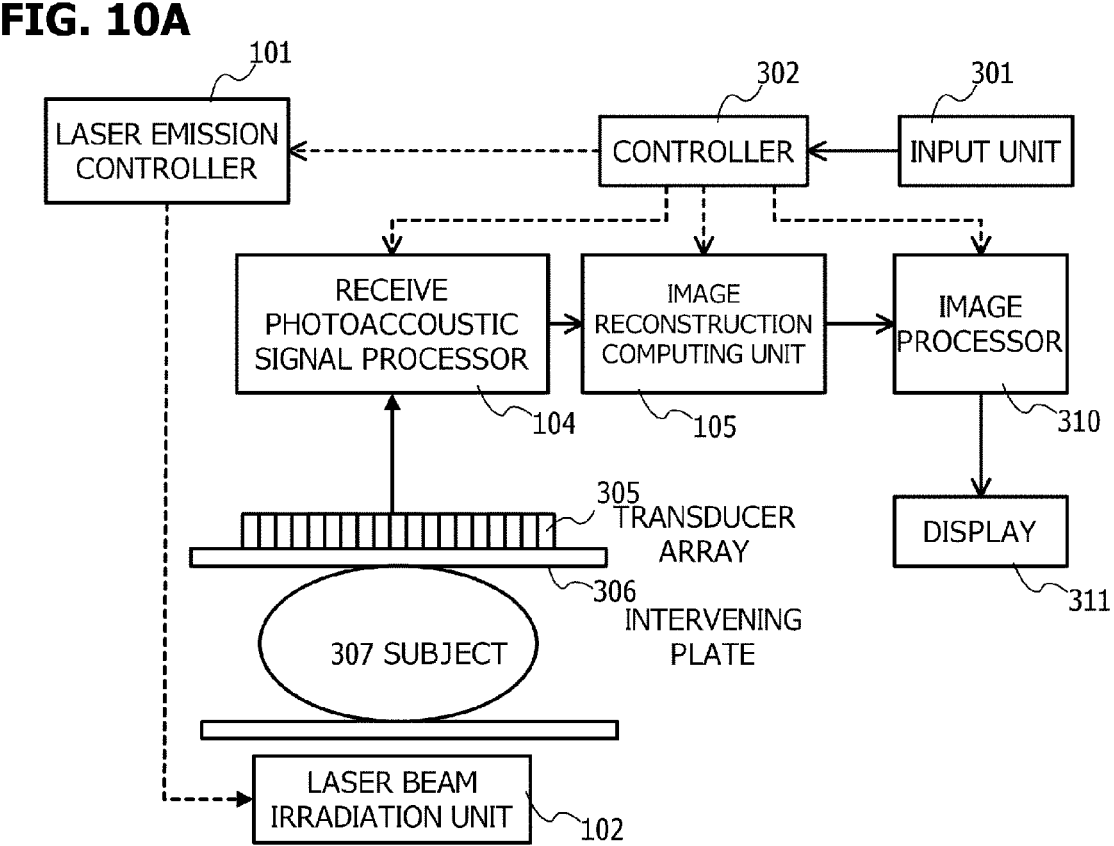
FIG. 10A is a diagram depicting a configuration of the ultrasonic image diagnostic apparatus based on the photoacoustic imaging method according to Example 2.

An ultrasonic image diagnostic apparatus based on the photoacoustic imaging method according to this example will now be described with reference to FIG. 10. FIG. 10A shows a configuration of the ultrasonic image diagnostic apparatus based on the photoacoustic imaging method according to this example. A composing element the same as Example 1 is denoted with a same reference numeral, where redundant description is omitted.

An input unit 301 is for inputting operation settings. A controller 302 controls the entire apparatus. A laser emission controller 101 controls and drives the pulse irradiation of a laser. A laser beam irradiation unit 102 irradiates a pulse laser beam onto a subject. A transparent stationary plate 103 is for securing a subject 307 between this transparent stationary plate 103 and an intervening plate 306, and is made of a material which allows a laser beam to transmit through. A transducer array 305 comprises two-dimensionally arrayed transducers, for receiving photoacoustic waves. A receive photoacoustic signal processing unit 104 amplifies a receive photoacoustic signal received by the transducer array 305 to increase the SNR, and converts the amplified receive photoacoustic signal into a digital signal, and is constituted by an analog amplifier and A/D converter, among others. To further improve the SNR, frequency filtering processing may be included. An image reconstruction computing unit 105 reconstructs a three-dimensional image using the photoacoustic imaging method based on the digitized receive photoacoustic signal, and creates voxel array data in which the intensity of the photoacoustic wave generated in each voxel is evaluated. An image processor 310 creates image data to be displayed on a display 311 according to the instruction from a controller 302 using the voxel array data created by the image reconstruction computing unit 105. The image processor 310 displays three-dimensional image data, and in particular creates two-dimensional projection data and various tomographic data, such as a maximum intensity brightness projection image (MIP). The display 311 displays the output of the image processor 310.

A difference of this example from Example 1 is that a type of data to be displayed on the display 311 can be specified from the input unit 301 to the controller 302 in order to indicate the configuration of the three-dimensional image data. By this information, the image processor 310 performs coordinate transformation, interpolation, image filtering and the like, for creating various projected images and tomographic images based on the three-dimensional voxel array data. Brightness voxel array data may be created using the data evaluating the intensity of the photoacoustic waves generated in each voxel. This brightness conversion may be performed by the image reconstruction computing unit 105.

The transducer array 305 is a two-dimensional array for obtaining three-dimensional data, as mentioned above. L denotes a number of transducers of the transducer array 305.

The intervening plate 306 is a plane parallel plate which has a different sound velocity from the subject 307, and allows ultrasonic waves to transmit through, just like Example 1, but is installed particularly for the purpose of securing the subject 307 along with the transparent stationary plate 103 in this example. The transparent stationary plate 103 should be transparent in the wavelength range of this laser beam so as to irradiate a pulse laser, but the shape can be merely a shape suitable for holding and securing the subject 307.

The biggest difference between this example and Example 1 is that the pulse laser beam is irradiated onto the subject 307 and ultrasonic waves are not transmitted, since the photoacoustic imaging method is used. The laser irradiation unit 102 includes a laser light source which can emit pulses at high power. The wavelength of the laser beam is a wavelength in a range where transmittance in the subject 307 is relatively high. In particular, when a biological tissue is the subject 307, it is preferable to emit near infrared light of which wavelength is approximately 800 nm to 1200 nm, then an SHG converter can be installed for a YAG laser apparatus or titanium-sapphire laser apparatus. A high power LD array light source can also be used. The laser irradiation unit 102 has various optical apparatuses, such as a beam expander and diffusing plate, in order to irradiate the emitted laser beam onto the subject 307 uniformly.

The laser emission control unit 101 irradiates the pulse laser by controlling and driving the laser irradiation unit 102 based on the emission control signal from the controller 302. Then the photoacoustic wave receiving operation is started by a control signal from the controller 302. The photoacoustic wave generated in the subject 307 by the laser pulse irradiation is received by the transducer array 305, and is converted into a receive photoacoustic signal, which is amplified by the receive photoacoustic signal processing unit 104, and is then input to the image reconstruction computing unit 105 as digital sampling data. The image reconstruction computing unit 105 executes the image reconstruction processing, and outputs the voxel array data to the image processing unit 310, and the image processor 310 performs the above mentioned image processing and displays a specified image on the display unit 311.

Figure 10B:
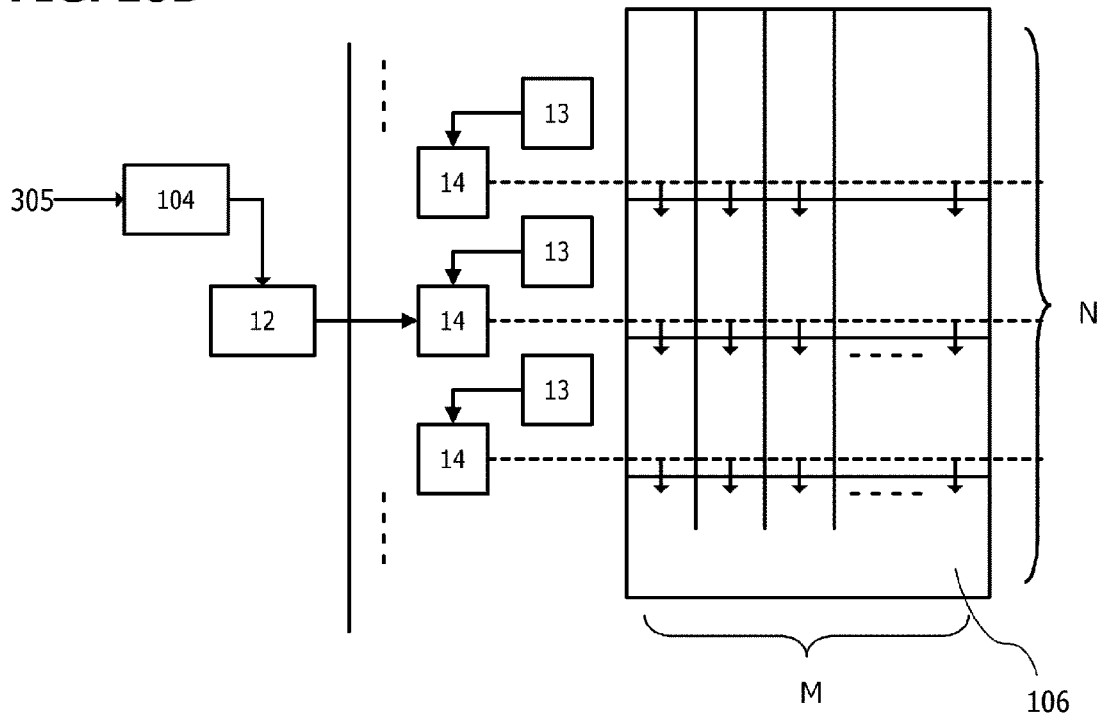
FIG. 10B is a diagram depicting a processing of the image reconstruction in Example 2.

Now the processing of the image reconstruction computing unit 105 will be described in detail with reference to FIG. 10B. In FIG. 10B, the reference numeral 104 designates a receive photoacoustic signal processor, the reference numeral 12 designates a memory, the reference numeral 13 designates a read address calculation unit, the reference numeral 14 designates a memory read controller, and the reference numeral 106 designates a voxel array memory for storing voxel array data. The voxel array memory 106 can be constructed by a random access DRAM, or by a combination of an FIFO memory and a random access DRAM. In FIG. 10B, the voxel array memory 106 is conceptually illustrated as a matrix array memory having N rows by M columns in order to simplify description on the operation. Here N is a total number of divisions on a plane in parallel with the transducer array surface of the voxel array, and M is a total number of divisions of the voxel array in the depth direction. In other words, to each voxel in the voxel array, each element of the voxel array memory 106, which is a N by M array memory, corresponds. In terms of correspondence with the conceptual diagram in FIG. 9, the voxel array 91 has N number of voxel columns 91*b*, and each voxel column 91*b* includes M number of voxels. In this case, each row of the N by M voxel array memory 106 corresponds to the voxel column 91*b*, and each memory element in the row corresponds to each voxel of the voxel column 91*b*. It is particularly preferable that each voxel corresponding to a memory element of each row of the voxel array memory 106 is disposed in sequence along the depth of the voxel column 91*b*.

According to a preferred configuration of this example, a set of an analog amplifier and an A/D converter is disposed in the receive photoacoustic signal processor 104 for each transducer of the transducer array 305 respectively. Thereby the time series data string of the receive photoacoustic signal received by each transducer is digitized, and stored in the memory 12 by parallel processing. In the memory 12, the time series data string of the digitized receive photoacoustic signals is stored for each transducer. For example, the memory 12 may be constituted by a one-dimensional memory, which is individually provided for each transducer. A memory is constructed such that a two-dimensional array can be accessed for each transducer.

It is further preferable that N number of memory read controllers 14 are disposed so as to process specific transducers in parallel. Each of the N number of memory read controllers 14 is disposed corresponding to N rows in the array memory 106 respectively. Just like Example 1, the memory read controller 14 reads a value of the receive photoacoustic signal at a timing corresponding to the photoacoustic wave propagation time in the memory 12, using the memory read address which is output by the read address calculation unit 13. The signal value which was read is added to a predetermined memory element of the array memory 106 (the value in the memory element and the signal value which was read are added, and the result thereof is stored in the memory element again). Here the memory element to be referred to in the array memory 106 is on the row corresponding to this memory read controller 14.

The read address calculation unit 13 calculates an address corresponding to the photoacoustic wave propagation time of a voxel of which depth sequentially changes, just like Example 1, using the transducer-voxel column distance x and the interval dz of the depths of the voxels. Using this address, the memory read controller 14 sequentially performs the above mentioned addition processing for the memory element in the corresponding row of the array memory 106.

A same number of read address calculation units 13 as the memory read controllers 14 may be disposed, but the address may be calculated by a common read address calculation unit 13 depending on the positional relationship of this transducer and the corresponding voxel column 91b. For example, addresses of a plurality of memory read controllers 14 can be calculated by a common read address calculation unit 13 for the transducers having the same transducer-voxel column distance x. If the voxel array 91 is equally divided vertically and horizontally on the bottom face thereof, the voxel columns 91b located concentrically around the transducer, as the center, have a same transducer-voxel column distance x, because of geometric symmetry. In this way, a number of read address calculation units 13 can be less than N.

Each memory read controller 14 reads a value of the receive photoacoustic signal value using the memory read address calculated recurrently by each read address calculation unit 13, whereby values in the memory elements in each row of the array memory 106 are sequentially updated in parallel. In other words, a column of the array memory 106 is sequentially updated according to the recurrence computing processing by each read address calculation unit 13. The update sequence may be in a direction of the deeper depth or shallower depth, depending on how the initial value is provided for the recurrence computing.

To update the data in the array memory 106, the array memory 106 may be constituted only by random access DRAMs so that the value is directly referred to, added or stored. Or the value may be stored once in a line memory or FIFO buffer memory, for example, which is disposed for each memory read controller 14, so that addition and update processing in the random access DRAM is performed after processing ends for all the depths.

By repeating the above processing for different transducers, voxel array data in which a three-dimensional image is reconstructed based on the photoacoustic imaging method can be obtained. In concrete terms, after the output from each transducer is processed by the receive photoacoustic signal processor 104 and the receive photoacoustic signal is stored in the memory 12, the data in the array memory 106 is updated by N number of memory read controllers 14 corresponding to specific transducers. Or L×N number of memory read controllers 14 may be provided to process data for all the transducers in parallel. Particularly in a latter case, a common read address calculation unit 13 can calculate the memory read address for sets of a transducer and voxel column having a same transducer-voxel column distance x. Recently parallel processing for volume data using many cores in a GPU have become possible, so parallel processing of this example can be executed by digital circuits including a GPU.

This example is an apparatus which recurrently determines the propagation time values of an ultrasonic wave, which is a photoacoustic wave including the effect of refraction due to an intervening plate having a different sound velocity, sequentially for targets at a different depth, using an approximate recurrence relation, and reconstructs a three-dimensional image based on the photoacoustic imaging method using the result. By determining propagation time values recurrently for voxels having different depths in sequence, and performing processing for each transducer and each voxel column in parallel based on the determined propagation time values, the entire processing time is decreased, and a three-dimensional image can be reconstructed in real-time. In other words, propagation time values can be recurrently calculated independently in general, for combinations of a transducer and a voxel column having a different transducer-voxel column distance x, so parallel processing can be performed easily for these transducers and voxel columns, and the overall processing time can be decreased. If the read address calculation unit 13 is common for combinations of a transducer and voxel column of which the transducer-voxel column distance x is the same, an increase in circuit size can be suppressed.

Compared with conventional disclosed technologies, the present invention has the following advantages.

In the case of a three-dimensional image reconstruction based on the photoacoustic imaging method, the transducer array is a two-dimensional array and the higher the number of voxels in the voxel arrangement the better in terms of resolution. This means that a number of photoacoustic wave propagation time values required for processing becomes high. The general calculation for refractive paths shown in U.S. Pat. No. 6,607,489, which requires a long processing time since many types of paths are used, is inappropriate for real-time processing. If the delay time values are calculated and stored in advance, many delay time values must be stored. In particular, depending on the image capturing conditions, a new set of delay time values is required each time the voxel array is changed, and it is impractical to store all of these values assuming all possible cases. Therefore the delay time values must be calculated each time the voxel array is changed, and as a result, it is unavoidable to increase the apparatus scale.

In the case of the method disclosed in WO 01-026555, which calculates the delay time recurrently, just like the present invention, the above mentioned problem is solved, but recurrence calculation is performed in a direction of changing the transducer-voxel column distance x mentioned in this example. The recurrence calculation basically requires sequential calculation, so in order to perform parallel processing easily by this method, the recurrence calculation must be performed in the depth direction. This means that if a number of voxels in the voxel array is Nx in the vertical direction, Ny in the horizontal direction and Nz in the depth direction, the Nz number of calculations can be performed in parallel. Whereas in the case of the present invention, parallel processing can be performed for a set of a transducer and a voxel column, that is, Nx×Ny number of calculations can be performed in parallel. If a uniform voxel array, which is suitable for generating a three-dimensional image, is used, a number of sections is about the same for Nx, Ny and Nz in each direction, so the degree of parallel processing (a number of processings that can be processed in parallel) of this example can be higher than the method disclosed in WO 01-026555. This difference in the degree of parallel processing increases as a number of sections increases and a number of transducers is more enhanced in order to improve resolution.

Furthermore, in the case of a standard grating type voxel array or a two-dimensional transducer array arrangement, each transducer-voxel column distance x becomes nonuniform. Therefore in the recurrence relation calculation in the x direction, approximation accuracy becomes nonuniform, and processing parameters increase. In this example, approximate recurrence relation processing for uniform intervals can be performed by setting the interval of the depths of the focal point to be the interval of the depths of the voxel array, hence processing can be simplified.

Thus if the present invention is used for the photoacoustic imaging method, recurrence processing for delay time calculation, which is suitable for parallel processing, can be performed, and an ultrasonic image diagnostic apparatus based on the photoacoustic imaging method, which can perform the entire processing in real-time, as the case of this example, can be provided.

Here the ultrasonic image diagnostic apparatus based on the photoacoustic imaging method was described, but an image diagnostic apparatus jointly using the ultrasonic echo method can be constructed by integrating the ultrasonic transmission unit and the aperture selection switch of Example 1, so that a photoacoustic image and ultrasonic image can be simultaneously displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment.

This application claims the benefit of Japanese Patent Application No. 2010-036890, filed on Feb. 23, 2010, which is hereby incorporated by reference herein in its entirety.

The invention claimed is:

1. An ultrasonic imaging apparatus comprising:
   an ultrasonic receiver having a plurality of receiving elements for receiving ultrasonic waves reflected or generated in an area of a subject through a medium having a sound velocity different from a sound velocity of the area;
   a receive beam former which forms a receive beam signal by performing delay control on received signals of receive channels corresponding to at least a part of said receiving elements of said ultrasonic receiver, according to a propagation time from a focal point position of the receive beam to said receiving element; and
   an image processor which generates an image using the receive beam signal, wherein said receive beam former sequentially calculates, for one of the receiving channels, propagation time values for a plurality of focal points by repeating processing for adding a change of propagation time value corresponding to a change amount of depth of focal point to an already calculated propagation time value to determine a propagation time value for a next focal point,
   wherein the repeat processing can be independently executed for each of said receive channels, and said receive beam former calculates the propagation time values in parallel for at least a part of said receive channels, and
   said receive beam former calculates the change of propagation time value using a recurrence relation and based on the change amount of depth of focal point, a recurrence parameter $\xi_i = \cos \theta'$ corresponding to the area and a recurrence parameter $\eta_i = \cos \theta$ corresponding to the medium, where $\theta'$ and $\theta$ are refractive angles of ultrasonic wave from the focal point to a receive channel in the area and medium respectively, and the recurrence parameter $\xi_i$ and the recurrence parameter $\eta_i$ being determined by the recurrence relation using the change amount of the depth of focal point, the sound velocity in the area and the sound velocity in the medium.

2. The ultrasonic imaging apparatus according to claim 1, wherein the recurrence relation to determine the recurrence parameters is described in a polynomial of values of the recurrence parameters at adjacent depths of focal point.

3. The ultrasonic imaging apparatus according to claim 1, wherein the change of propagation time value is determined as a polynomial of the depth of focal point.

4. The ultrasonic imaging apparatus according to claim 1, wherein said receive beam former stores a reference propagation time value, which is a propagation time value determined in advance for a specific depth of focal point, and
   when the depth of focal point reaches the specific depth of focal point in the repeat processing, the propagation time value at this depth of focal point is regarded as the stored reference propagation time value, and a propagation time value at a next depth of focal point is calculated based on this reference propagation time value.

5. The ultrasonic imaging apparatus according to claim 2, wherein said receive beam former stores a reference propagation time value and reference recurrence parameters, which are a propagation time value and recurrence parameters determined in advance for a specific depth of focal point, and
   when the depth of focal point reaches the specific depth of focal point in the repeat processing, the propagation time value and recurrence parameters at this depth of focal point are regarded as the stored reference propagation time value and reference recurrence parameters, and a propagation time value and recurrence parameters at a next depth of focal point are calculated based on the reference propagation time value and reference recurrence parameters.

6. The ultrasonic imaging apparatus according to claim 3, wherein said receive beam former stores a propagation time value determined in advance for a specific depth of focal point, and coefficients of the polynomial to be used for focal points subsequent to the specific depth of focal point, and
   when the depth of focal point reaches the specific depth of focal point in the repeat processing, the propagation time value at this depth of focal point is regarded as a stored reference propagation time value, and the change of propagation time value is determined by the polynomial using the stored coefficients in subsequent processing.

7. The ultrasonic imaging apparatus according to claim 1, wherein said receive beam former stores propagation time values determined in advance for a plurality of reference focal points, and
   when the focal point reaches any of the reference focal points in the repeat processing, the propagation time value at this focal point is regarded as a stored reference propagation time value, and a change of propagation time value in subsequent processing is determined by the reference propagation time value at this depth of focal point and a reference propagation time value at a next depth of focal point.

8. The ultrasonic imaging apparatus according to claim 1, wherein
said receive beam former includes for each of said receive channels, a memory that stores in a time series received signals sequentially received from a receiving element corresponding to said receive channel, a memory read controller which controls reading from said memory, and a memory address calculation unit which calculates a read address of said memory,
said receive beam signal is formed by adding received signals of each of said receive channels which are read by said memory read controller from said memory according to the read address calculated by said memory address calculation unit, and
said memory address calculation unit calculates read address positions corresponding to the propagation time values which are sequentially calculated for the plurality of focal points to sequentially calculate read addresses corresponding to the plurality of focal points.

9. The ultrasonic imaging apparatus according to claim 8, wherein said memory address calculation unit calculates a read address in a real number form, and
said receive beam former interpolates two received signals stored in an address corresponding to an integer portion of the calculated read address in the real number form and in a next address thereto, according to a decimal portion of the read address in the real number form, and forms a receive beam signal using the interpolated received signals.

10. The ultrasonic imaging apparatus according to claim 1, wherein said ultrasonic receiver also serves as an ultrasonic transmitter for transmitting ultrasonic waves to the subject, and
said ultrasonic imaging apparatus forms an image of inside the subject by irradiating the subject with ultrasonic waves and receiving reflected ultrasonic waves that have been reflected in the subject.

11. An ultrasonic imaging apparatus, comprising:
an ultrasonic receiver having a plurality of receiving elements for receiving ultrasonic waves generated in an area of a subject through a medium having a sound velocity different from a sound velocity of the area;
an image reconstruction computing unit which obtains voxel array data evaluating an intensity of an ultrasonic wave generated in each voxel based on an ultrasonic wave received by said ultrasonic receiver; and
an image processor which obtains image data using the voxel array data obtained by said reconstruction computing unit,
wherein said image reconstruction computing unit sequentially calculates, for one of the receiving channels, propagation time values for a plurality of voxels by repeating processing for adding a change of propagation time value corresponding to a change amount of depth of a voxel to an already calculated propagation time value to determine a propagation time value for a next voxel,
wherein the repeat processing can be independently executed for each voxel column, and said image reconstruction computing unit calculates the propagation time values in parallel for at least a part of the voxel columns, and
the change of propagation time value is calculated using a recurrence relation and based on the change amount of depth of voxel, a recurrence parameter $\xi_i = \cos \theta'$ corresponding to the area and a recurrence parameter $\eta_i = \cos \theta$ corresponding to the medium, where $\theta'$ and $\theta$ are refractive angles of ultrasonic wave from the focal point to a receive channel in the area and medium respectively, and the recurrence parameter $\xi_i$ and the recurrence parameter $\eta_i$ being determined by the recurrence relation using the change amount of the depth of voxel, the sound velocity in the area and the sound velocity in the medium.

12. A method of controlling delay in an ultrasonic imaging apparatus which receives ultrasonic waves reflected or generated in an area of a subject, and forms a receive beam by performing delay processing according to a propagation time between a focal point position of the receive beam and a receiving element, comprising:
sequentially calculating, for one of plural receiving channels, propagation time values for a plurality of focal points by repeating processing for calculating a change of propagation time value corresponding to a change amount of depth of focal point, and processing for adding the calculated change of propagation time value to an already calculated propagation time value to determine a propagation time value for a next focal point;
enabling the repeat processing to be independently executed for each receive channel, and calculating the propagation time values in parallel for at least a part of the receive channels, and
calculating the change of propagation time value using a recurrence relation and based on the change amount of depth of focal point, a recurrence parameter $\xi_i = \cos \theta'$ corresponding to the area and a recurrence parameter $\eta_i = \cos \theta$ corresponding to the medium, where $\theta'$ and $\theta$ are refractive angles of ultrasonic wave from the focal point to a receive channel in the area and medium respectively, and the recurrence parameter $\xi_i$ and the recurrence parameter $\eta_i$ being determined by the recurrence relation using the change amount of the depth of focal point, the sound velocity in the area and the sound velocity in the medium.

13. A non-transitory computer-readable storage medium storing, in executable form, a delay control program executed in an ultrasonic imaging apparatus which receives ultrasonic waves reflected or generated in an area of a subject, and forms a receive beam by performing delay processing according to a propagation time between a focal point position of the receive beam and a receiving element, the delay control program causing a computer to execute:
sequentially calculating, for one of plural receiving channels, propagation time values for a plurality of focal points by repeating processing for calculating a change of propagation time value corresponding to a change amount of depth of focal point, and processing for adding the calculated change of propagation time value to an already calculated propagation time value to determine a propagation time value for a next focal point;
enabling the repeat processing to be independently executed for each receive channel, and calculating the propagation time values in parallel for at least a part of the receive channels, and
calculating the change of propagation time value using a recurrence relation and based on the change amount of depth of focal point, a recurrence parameter $\xi_i = \cos \theta'$ corresponding to the area and a recurrence parameter $\eta_i = \cos \theta$ corresponding to the medium, where $\theta'$ and $\theta$ are refractive angles of ultrasonic wave from the focal point to a receive channel in the area and medium respectively, and the recurrence parameter $\xi_i$ and the recurrence parameter $\eta_i$ being determined by the recurrence relation using the change amount of the depth of focal point, the sound velocity in the area and the sound velocity in the medium.

14. The ultrasonic imaging apparatus according to claim 1, wherein the recurrence parameters include a parameter based on the refractive angle.

15. The ultrasonic imaging apparatus according to claim 11, wherein the recurrence parameters include a parameter based on the refractive angle.

16. The ultrasonic imaging apparatus according to claim 1, wherein a formula for calculating the change of propagation time consists of the recurrence parameters $\xi_i$ and $\eta_i$, parameters unique to a receiving channel for which the propagation time values is calculated, and parameters common to all receiving channels, and the recurrence relation for determining the recurrence parameters $\xi_i$ and $\eta_i$ consists of parameters unique to a receiving channel for which the propagation time values is calculated, and parameters common to all receiving channels.

17. The ultrasonic imaging apparatus according to claim 1, wherein the change of the propagation time $dT_i$ is calculated using the formula $$dT_i = \xi_i \frac{dz}{V_{tis}}$$

or approximation thereof, and the recurrence parameters $\xi_i$ and $\eta_i$ are determined using the following formulas $$\xi_{i+1} = \xi_i + \frac{\xi_i(1-\xi_i^2)}{d \cdot \gamma \cdot r_i^3 + z_i} dz,$$

$$\eta_{i+1} = \eta_i + \gamma^2 r_i d\xi_i.$$

where $$r_i = \frac{\xi_i}{\eta_i}, \gamma = \frac{V_m}{V_{tis}},$$

and $V_{tis}$ and $V_m$ represent sound velocity in the area and medium respectively.

* * * * *